US012032332B2

(12) United States Patent
Fujino et al.

(10) Patent No.: US 12,032,332 B2
(45) **Date of Patent: *Jul. 9, 2024**

(54) MAGENTA TONER, DEVELOPER, TONER ACCOMMODATING UNIT, IMAGE FORMING APPARATUS, AND IMAGE FORMING METHOD

(71) Applicant: RICOH COMPANY, LTD., Tokyo (JP)

(72) Inventors: Hiyori Fujino, Shizuoka (JP); Keisuke Tada, Shizuoka (JP); Shoki Matsuda, Shizuoka (JP); Fumihiko Chimoto, Shizuoka (JP); Takashi Okano, Shizuoka (JP); Ayumi Satoh, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 674 days.

This patent is subject to a terminal disclaimer.

(21) Appl. No.: 17/174,382

(22) Filed: Feb. 12, 2021

(65) Prior Publication Data

US 2021/0286279 A1 Sep. 16, 2021

(30) Foreign Application Priority Data

Mar. 11, 2020 (JP) ................................. 2020-041916
Jun. 18, 2020 (JP) ................................. 2020-105407

(51) Int. Cl.
*G03G 9/087* (2006.01)
*G03G 9/09* (2006.01)
(Continued)

(52) U.S. Cl.
CPC ....... *G03G 9/08755* (2013.01); *G03G 9/0906* (2013.01); *G03G 9/0926* (2013.01); *G03G 15/0865* (2013.01); *G03G 15/2064* (2013.01)

(58) Field of Classification Search
CPC . G03G 9/08755; G03G 9/0906; G03G 9/0926
See application file for complete search history.

(56) References Cited

U.S. PATENT DOCUMENTS

2015/0253687 A1* 9/2015 Chiba ................ G03G 9/08797 430/108.1
2020/0209772 A1 7/2020 Fujino et al.
2021/0397105 A1 12/2021 Fujino et al.

FOREIGN PATENT DOCUMENTS

JP 2002-040705 2/2002
JP 2003-107783 4/2003
(Continued)

OTHER PUBLICATIONS

U.S. Office Action dated Mar. 3, 2023, in U.S. Appl. No. 17/336,866, 11 pages.
(Continued)

*Primary Examiner* — Peter L Vajda
*Assistant Examiner* — Boone Alexander Evans
(74) *Attorney, Agent, or Firm* — Grüneberg and Myers PLLC

(57) ABSTRACT

A magenta toner is provided. The magenta toner comprises toner particles each comprising a binder resin and a colorant. From 1.0% to 25.0% by number of the toner particles have a CH rate of 25.0% or more in absolute value. The CH rate is calculated from the following formula (1):

$$CH\ \text{rate}(\%)=[(I_n-I_{ave})/I_{ave}]\times 100 \quad \text{Formula (1)}$$

where, in a Raman spectrum of each toner particle, $I_n$ represents an integrated intensity within a wavenumber region of from 2,750 to 3,250 $cm^{-1}$ when an intensity at a wavenumber λ within a wavenumber region of from 1,200 to 3,250 $cm^{-1}$ is s normalized to 1, where a total intensity of all the toner particles is maximum at the wavenumber λ; and $I_{ave}$ represents an average of the $I_n$.

16 Claims, 6 Drawing Sheets

(51) Int. Cl.
*G03G 15/08* (2006.01)
*G03G 15/20* (2006.01)

(56) References Cited

FOREIGN PATENT DOCUMENTS

| | | |
|---|---|---|
| JP | 2006-209094 | 8/2006 |
| JP | 2008-96992 | 4/2008 |
| JP | 2009-69397 | 4/2009 |
| JP | 2009-286902 | 12/2009 |
| JP | 2010-060788 | 3/2010 |
| JP | 2016-045394 | 4/2016 |

OTHER PUBLICATIONS

U.S. Appl. No. 17/336,866, filed Jun. 2, 2021, 2021/0397105, Fujino et al.
Office Action received for Japanese Patent Application No. 2020-105407, mailed on Dec. 20, 2023, 2 pages.

* cited by examiner

MAGENTA TONER, DEVELOPER, TONER ACCOMMODATING UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application Nos. 2020-041916 and 2020-105407, filed on Mar. 11, 2020 and Jun. 18, 2020, respectively, in the Japan Patent Office, the entire disclosure of each of which is hereby incorporated by reference herein.

BACKGROUND

Technical Field

The present disclosure relates to a magenta toner, a developer, a toner accommodating unit, an image forming apparatus, and an image forming method.

Description of the Related Art

In an electrophotographic image forming process, an electrostatic latent image is formed on an electrostatic latent image bearer, and a charged toner is conveyed by a developer bearer to develop the latent image into a toner image. The toner image is then transferred onto a recording medium such as a paper sheet and fixed thereon by means of heating or the like, thereby outputting an image. Toner remaining on the electrostatic latent image bearer without being transferred is collected by a cleaner and discharged to a waste toner storage.

In the developing process described above, toner particles supplied to a developing device vary in particle size, shape, charging property, etc., and it is very difficult to ideally control all the toner particles.

Toner particles which have not been uniformly mixed with carrier particles without being triboelectrically charged or those which have low charging property are difficult to control in a machine and are likely to scatter to cause contamination of the machine.

When the adhesive force between a part of toner particles and a carrier, a photoconductor, or a transfer belt is too strong, the toner particles are not sufficiently transferred, thereby increasing the toner consumption.

Since even a small amount of variation in the properties of toner particles leads to abnormalities in an image forming system, a property distribution of toner particles should be narrowed to improve uniformity.

There has been an attempt to improve transfer efficiency by narrowing the charge distribution by the use of an external additive produced by a flame hydrolysis method.

There has been another attempt to improve transfer rate by, in addition to selecting a specific release agent, narrowing the shape distribution so as to reduce the number of excessively-deformed particles.

There has been another attempt to reduce toner scattering by selecting a specific resin to improve scratch resistance of the fixed image, narrowing the particle size distribution, and spheroidizing the particles.

SUMMARY

In accordance with some embodiments of the present invention, a magenta toner is provided. The magenta toner comprises toner particles each comprising a binder resin and a colorant. From 1.0% to 25.0% by number of the toner particles have a CH rate of 25.0% or more in absolute value. The CH rate is calculated from the following formula (1):

$$CH\ \text{rate}(\%)=[(I_n-I_{ave})/I_{ave}]\times 100 \quad \text{Formula (1)}$$

where, in a Raman spectrum of each toner particle, $I_n$ represents an integrated intensity within a wavenumber region of from 2,750 to 3,250 $cm^{-1}$ when an intensity at a wavenumber λ within a wavenumber region of from 1,200 to 3,250 $cm^{-1}$ is s normalized to 1, where a total intensity of all the toner particles is maximum at the wavenumber λ; and $I_{ave}$ represents an average of the $I_n$.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
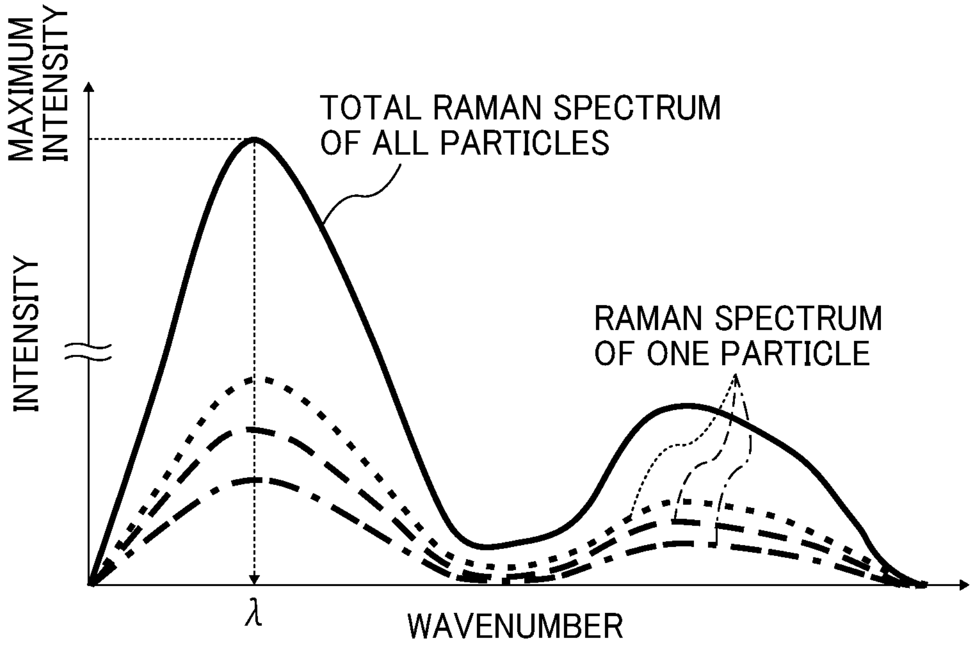
FIG. 1 is a diagram showing a method for determining a wavenumber λ.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a toner is provided that provides excellent transferability and in-machine contamination resistance without deteriorating cleanability.

Hereinafter, a magenta toner (may also be simply referred to as "toner"), a developer, a toner accommodating unit, an image forming apparatus, and an image forming method according to some embodiments of the present invention are described with reference to the drawings. Incidentally, it is to be noted that the following embodiments are not limiting the present invention and any deletion, addition, modification, change, etc. can be made within a scope in which person skilled in the art can conceive including other embodiments, and any of which is included within the scope of the present invention as long as the effect and feature of the present invention are demonstrated.

Toner

A magenta toner according to an embodiment of the present invention comprises toner particles each containing a binder resin and a colorant, and 1.0% to 25.0% by number of the toner particles have a CH rate (described later) of 25.0% or more in absolute value.

Details are described below.

Overview of CH Rate

The CH rate is an acronym for Content Heterogeneity (content non-uniformity) that is an index defined for evaluating non-uniformity in raw material content in the toner. The CH rate is a measure of how much the raw material content in each toner particle is different from that at the time of preparing the toner. Naturally, it is preferable that the raw material content in each toner particle do not deviate from that at the time of preparing the toner.

Calculation of CH Rate

The CH rate is calculated from a Raman spectrum of the toner.

In the present disclosure, the "CH rate" is calculated from the following formula (1), where, in a Raman spectrum of each toner particle, $I_n$ represents an integrated intensity within a wavenumber region of from 2,750 to 3,250 $cm^{-1}$ when an intensity at a wavenumber λ within a wavenumber region of from 1,200 to 3,250 $cm^{-1}$ is normalized to 1, where a total intensity of all the toner particles is maximum at the wavenumber λ; and $I_{ave}$ represents an average of the $I_n$.

$$CH\ \text{rate}(\%)=[(I_n-I_{ave})/I_{ave}]\times 100 \qquad \text{Formula (1)}$$

The Raman spectrum is measured with a Raman microscope. The measuring apparatus is not particularly limited. For example, an instrument XploRA PLUS (available from HORIBA, Ltd.) may be used. A Raman spectrum is acquired for each of 500 to 600 toner particles, then the CH rate is calculated from the formula (1).

Raman Spectrum Measurement Conditions

In the present disclosure, the Raman spectrum is measured under the following measurement conditions.

(1) Selection of Pump Laser

A Raman spectrum is measured with a laser having a pump wavelength of 785 nm. Laser light is emitted to each toner particle with the laser intensity adjusted so as not to melt the toner particle.

(2) Number of Particles to be Measured

Since toner particles have spectrum shapes slightly different from each other, 500 to 600 toner particles are subjected to the measurement to evaluate the variation. The measurement variation converges as 500 to 600 toner particles have been measured, making it possible to compare different types of toners.

(3) Wavenumber Region for Measurement

The measurement is performed within a wavenumber region encompassing the wavenumber region of from 1,200 to 3,250 $cm^{-1}$ that is used for an analysis.

(4) Focus Adjustment Conditions

A focus adjustment is performed so that the outermost surface of each toner particle is in focus.

(5) Other Setting Items

Other measurement conditions related to the resolution of the Raman spectrum are set as follows: the magnification of the objective lens is set to 50 times, and the plot interval in the wavenumber direction of the Raman spectrum is set to about 1 to 2 $cm^{-1}$.

Preparation of Sample

To measure toner particles one by one, a sample is prepared by dispersing toner particles on a quartz substrate.

Correction of Raman Spectrum

Since the Raman spectrum has been influenced by fluorescence and/or noise, it is desirable that the spectrum data is subjected to baseline correction.

The procedure of baseline correction is not particularly limited. One example procedure of baseline correction is described below.

The baseline correction of the spectrum may be performed using a software program Labspec 6.0 (available from HORIBA, Ltd.).

(1) The measured Raman spectrum is extracted within a wavenumber region of from 1,200 to 3,800 $cm^{-1}$.

(2) The spectrum extracted in (1) is subjected to a baseline correction under the order of 5, the maximum number of 4, and the noise number of 0.

(3) The spectrum corrected in (2) is extracted again within a wavenumber region of from 1,200 to 3,250 $cm^{-1}$.

Normalization of Raman Spectrum

Since the intensity of the Raman spectrum varies depending on the size and shape of the measurement target and/or the type of raw material, it is not possible to simply compare the Raman spectrum intensities among different toner particles. To make it possible to compare different toner particles with each other, the Raman spectrum is subjected to a normalization process. Specifically, the baseline-corrected spectrum is subjected to a normalization process using a data editing software program (e.g., EXCEL).

The normalization process may be as follows.

(1) As illustrated in FIG. 1, a total spectrum is obtained by adding all the Raman spectra, and a wavenumber λ at the maximum intensity of the total spectrum is determined.

Figure 2:
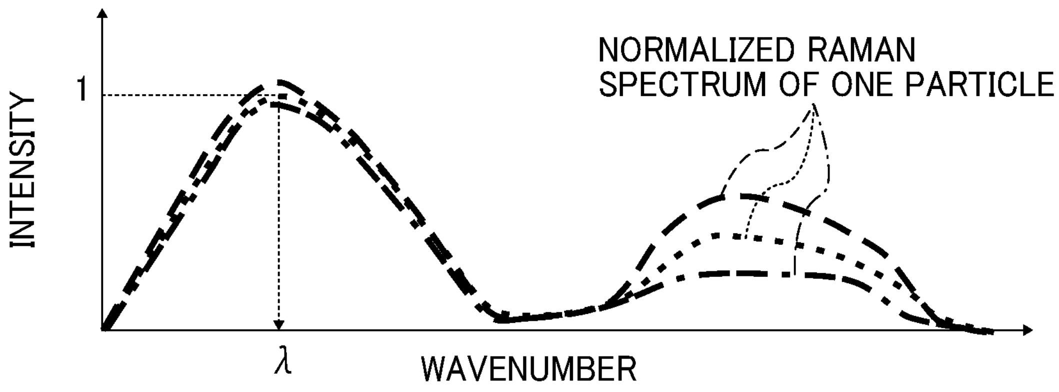
FIG. 2 is a diagram showing a method for normalizing the intensity at the wavenumber λ to 1.

(2) A correction coefficient X(n) to make the Raman spectrum of the n-th particle have an intensity of 1 at a wavenumber λ, as illustrated in FIG. 2, is determined. The correction coefficient X(n) is multiplied over the entire wavenumber region of the spectrum to normalize the spectrum intensity. Hereinafter, a spectrum which has been subjected to the normalization is referred to as a normalized spectrum.

This process is done for all the measured Raman spectra of particles.

Removal of Noise Data

In measuring the Raman spectrum, there is a case in which noise data has been acquired. The evaluation will be incorrect if the noise data is included in calculating the CH rate. Therefore, the noise data is removed as follows.

A spectrum area S(n) of the spectrum of the n-th particle normalized in (2) is calculated. This process is done for all the measured particles.

The standard deviation σ(S) of S(n) of all particles is calculated, and data of particles (n) that do not satisfy $S(n)-2\times\sigma(S)\leq S(n)\leq S(n)+2\times\sigma(S)$ are treated as error data and excluded from the calculation target of the CH rate.

Calculation of CH Rate

Figure 3:
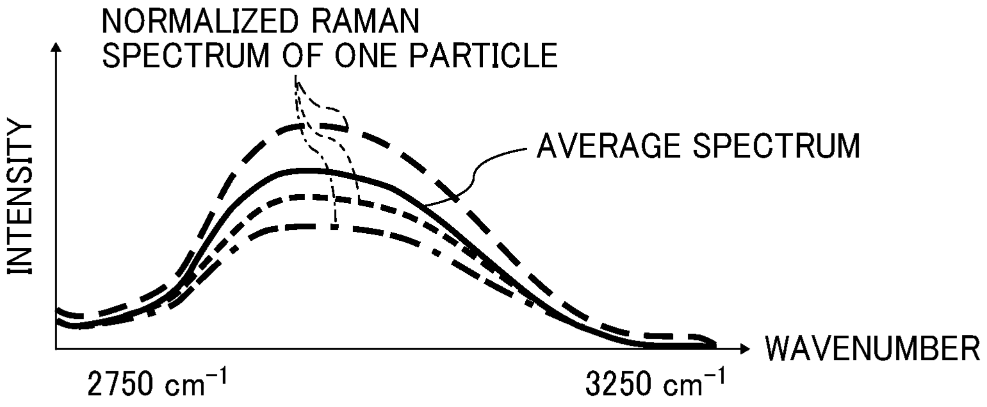
FIG. 3 is a diagram showing a method for calculating an average spectrum intensity within a wavenumber region of from 2,750 to 3,250 $cm^{-1}$.

FIG. 3 is a graph showing a region of from 2,750 to 3,250 $cm^{-1}$ in FIG. 2.

An average spectrum of particles (n) that have not been excluded by the noise data removal process is obtained.

Figure 4:
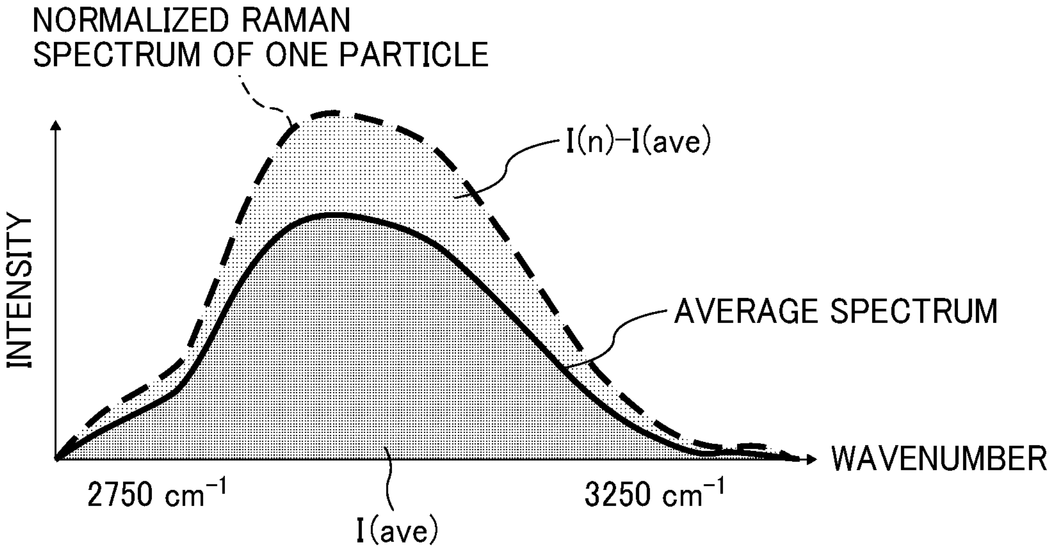
FIG. 4 is a diagram showing a method for calculating a CH rate from the difference between a spectrum of one particle and the average spectrum.

FIG. 4 is a graph showing both the average spectrum obtained in FIG. 3 and a spectrum of a particle (n).

An integrated intensity $I_n$ of the particle (n) within a region of from 2,750 to 3,250 $cm^{-1}$ is calculated, and the average $I_{ave}$ of $I_n$ of all particles is calculated.

The difference in integrated intensity within a region of from 2,750 to 3,250 $cm^{-1}$ between the spectrum of the particle (n) and the average spectrum is represented by $I_n$-$I_{ave}$. The CH rate is calculated from the following formula (1) as the rate of change with respect to the average.

$$CH\ \text{rate}(\%)=[(I_n-I_{ave})/I_{ave}]\times 100 \quad \text{Formula (1)}$$

$I_n$ represents an integrated intensity within a region of from 2,750 to 3,250 $cm^{-1}$ in the Raman spectrum of the n-th particle.

$I_{ave}$ represents the average of $I_n$ of all the particles.

Since the intensity of the Raman spectrum differs depending on the type of raw material used, the CH rate is not calculated as the difference between $I_n$ and $I_{ave}$, but as the rate of change as in the formula (1), which is the same concept as the coefficient of variation (CV).

An analysis within a region of from 2,750 to 3,250 $cm^{-1}$, where a spectrum of a colorant hardly appears, makes it possible to accurately evaluate the content variation of raw materials other than the colorant.

As a result of intensive studies, the inventors of the present invention have found that when from 1.0% to 25.0% by number of the toner particles have a CH rate, which indicates non-uniformity of resin component content in the toner particle, of 25.0% or more in an absolute value, transferability, in-machine contamination resistance, and cleanability can be achieved at the same time.

When more than 25.0% by number of the toner particles have a CH rate of 25.0% or more in absolute value, the effect of reducing in-machine contamination caused by toner scattering and the effect of improving transferability become insufficient.

When less than 1.0% by number of the toner particles have a CH rate of 25.0% or more in absolute value, toner particles causing background fouling are greatly reduced. However, this results in insufficient formation of a dam with such toner particles at the cleaning blade portion, which may result in the occurrence of defective cleaning.

When 5.0% to 20.0% by number of the toner particles have a CH rate of 25.0% or more in absolute value, the effect of reducing in-machine contamination and the effect of improving transferability become insufficient are enhanced, and good cleanability is exerted.

Preferably, 3.0% by number or less of the toner particles, more preferably 2.0% by number or less of the toner particles, have a CH rate of 50.0% or more in absolute value. The threshold of toner particles having a CH rate of 50.0% in absolute value exists approximately outside the tail of the particle distribution. Toner particles having a CH rate of 50.0% or more in absolute value are those with extremely different compositions that are out of the normal distribution.

Such toner particles can cause defective transfer and particularly easily scatter in the machine. By reducing the proportion of toner particles having a CH rate of 50.0% or more in absolute value, in-machine contamination resistance can be improved.

The median of the CH rate is preferably −3.0% or more. When the median of the CH rate is −3.0% or more, toner scattering due to carrier deterioration does not occur, and in-machine contamination resistance does not deteriorate.

Since the CH rate evaluates the divergence from the average spectrum, the sum of the CH rates of all the toner particles becomes zero. However, when there is a deviation in the distribution, particularly when there are some particles with extremely different compositions, the median of the CH rate does not become zero.

When the median of the CH rate is a negative value, it means that toner particles having an extremely high CH rate, that is, toner particles containing a large amount of resin component are present. By contrast, when the median of the CH rate is a positive value, it means that toner particles having an extremely low CH rate, that is, toner particles containing a small amount of resin component, such as toner particles containing an extremely large amount of colorant, are present.

It is likely that toner particles having a high CH rate containing a large amount of resin component contains an excessive amount of release agent. Toner particles containing a large amount of release agent are likely to spent on the carrier, which may cause a reduction in charging ability due to carrier contamination.

Thus, the lower the median of the CH rate, the more toner particles having a high CH rate that are likely to cause carrier contamination. Therefore, it is preferable that the median of the CH Rate is not low.

The method for producing the toner according to an embodiment of the present invention is not particularly limited. In a kneading-pulverizing method, it is desirable that raw materials are finely dispersed in advance or prevented from reaggregating by increasing the kneading power or controlling the temperature, so that the raw materials are pulverized with being more finely dispersed in the binder resin.

As one example of chemical methods, a dissolution suspension method is described below.

A toner composition containing at least a binder resin, a colorant, and a release agent is dissolved in an organic solvent, then these materials are made finer by a shearing force or a collision force. At this time, when a shearing force and a collision force are used in combination, toner particles with non-uniform composition having a CH rate of 25.0% or more in absolute value can be effectively reduced.

The dispersion method is not particularly limited, but preferred examples of finely-dispersing methods by shearing include a method of pulverizing materials with a high shearing force that is generated with a narrow gap between a rotor and a stator. Preferred examples of finely-dispersing methods by collision include a method of pulverizing materials by rotating a vessel filled with beads (e.g., zirconia beads) to cause collision between the beads or between the beads and the vessel.

Pulverization by collision is particularly effective for large materials exceeding 1 μm, while pulverization by shearing is effective for making submicron-order materials much finer. Since these two pulverization methods have different target regions, the material uniformity is improved when they are used together. Therefore, it is particularly preferable that these two methods are used in combination. The order of dispersion by shearing and dispersion by collision is not particularly limited.

To efficiently make the materials finer, in finely-dispersing methods by shearing, the peripheral speed of the rotor preferably exceeds 12 m/s. In pulverization methods by collision, the disk peripheral speed is preferably 6 m/s or more, more preferably from 10 to 12 m/s. When the disk peripheral speed is less than 6 m/s in pulverization methods by collision, sufficient pulverization energy cannot be obtained by collision and sufficient dispersion cannot be achieved because the beads are unevenly distributed. By contrast, when the disk peripheral speed is increased too much, dispersion becomes excessive, and toner particles causing background fouling is reduced to degrade cleanability. Moreover, there is also a risk of reaggregation due to liquid temperature rise and overdispersion.

The media diameter is preferably 0.5 mm or less, more preferably 0.4 to 0.3 mm or less. The smaller the beads, the greater the total surface area of the beads and the more opportunities for dispersion due to collision, increasing the dispersion efficiency. When the beads are too small, it is necessary to narrow the opening of the screen that separates the beads and the process liquid, so there is a risk that the liquid temperature rises without increasing the flow rate to cause reaggregation.

Furthermore, to reduce toner particles with a non-uniform composition having a CH rate exceeding 25.0% in absolute value, it is also effective to disperse in the dispersion liquid an inorganic matter having a higher hardness than organic matter such as the colorant and the release agent.

The inorganic matter is not specifically limited. As an example, a case in which montmorillonite, which is an organically-modified layered inorganic mineral, is added is described below.

A toner composition containing at least a binder resin, a colorant, a release agent, and an organically-modified layered inorganic mineral is dissolved in an organic solvent, then these materials are made finer by a collision force using a media-type disperser. In a case in which the composition contains an organically-modified layered inorganic mineral, compared with a case in which no organically-modified layered inorganic mineral is contained, the materials can be finely dispersed more efficiently and toner particles with a non-uniform composition can be reduced. This is because an opportunity for collision occurs between the beads and the inorganic matter and between the vessel and the inorganic matter, in addition to between the beads and between the beads and the vessel, so that the organic matter having a low hardness can be effectively dispersed.

In a rotor-stator-type shearing dispersion, the addition of an inorganic matter does not increase the pulverization efficiency, and the inorganic matter should be utilized as a pulverization medium.

The proportion of the added inorganic matter to all solid contents is preferably from 0.2% to 2.0% by mass, more preferably from 0.7% to 1.5% by mass. When the proportion of the added inorganic matter is from 0.2% to 2.0% by mass, the function as a pulverization medium is sufficiently exhibited, and the uniformity of the CH rate is improved.

The shape, size, etc., of the toner are not particularly limited and can be suitably selected to suit to a particular application. Preferably, the average circularity, the volume average particle diameter, and the ratio of the volume average particle diameter to the number average particle diameter are as follows.

The average circularity is the average of the circularity of each toner particle. The circularity is obtained by dividing the perimeter of a circle having the same area as a projected image of a toner particle by the perimeter of the projected image of the toner particle. Preferably, the average circularity is from 0.950 to 0.980, more preferably from 0.960 to 0.975. Preferably, the proportion of particles having a circularity of less than 0.950 is 15.0% by number or less.

When the average circularity is 0.950 or more, satisfactory transferability and high-quality images free from dust particle can be obtained. When the average circularity is 0.980 or less, in an image forming system employing blade cleaning, defective cleaning does not occur on a photoconductor or a transfer belt. In addition, the resulting image is free from fouling. For example, in the case of forming an image having a high image area rate such as a photographic image, even when an untransferred image is formed on the photoconductor due to defective sheet feeding, residual toner particles remaining and accumulating on the photoconductor do not cause background fouling. Furthermore, such toner particles do not contaminate a charger such as a charging roller for contact-charging the photoconductor, and the charger is able to exert its charging ability.

The average circularity can be measured by a flow particle image analyzer (FPIA-2100 available from Sysmex Corporation) and analyzed with an analysis software program (FPIA-2100 Data Processing Program for FPIA version 00-10).

Specifically, 0.1 to 0.5 mL of a 10% by mass aqueous solution of a surfactant (an alkylbenzene sulfonate, NEOGEN SC-A available from DKS Co., Ltd.) is put in a 100-mL glass beaker, then 0.1 to 0.5 g of each toner is added thereto and mixed with a micro spatula, and 80 mL of ion-exchange water is further added thereto. The resulting dispersion liquid is subjected to a dispersion treatment with an ultrasonic disperser (available from HONDA ELECTRONICS CO., LTD.) for 3 minutes. The dispersion liquid is subjected to a measurement by FPIA-2100 until the concentration becomes 5,000 to 15,000 particles/μL to measure the shape and the shape distribution of the toner.

In this measurement, the concentration of the dispersion liquid is adjusted to 5,000 to 15,000 particles/μL for measurement reproducibility of the average circularity. To achieve this concentration, conditions of the dispersion liquid should be adjusted, such as the addition amounts of the surfactant and toner. The required amount of the surfactant depends on hydrophobicity of the toner. Adding an excessive amount of the surfactant generates bubble noise. Adding an insufficient amount of the surfactant causes the toner to get wet insufficiently, resulting in insufficient dispersion. The addition amount of the toner depends on its particle diameter. The smaller the particle diameter, the smaller the addition amount, and vice versa. When the particle diameter of the toner is from 3 to 10 μm, the addition amount of the toner is from 0.1 to 0.5 g to adjust the concentration of the dispersion liquid to 5,000 to 15,000 particles/μL.

The volume average particle diameter of the toner is not particularly limited and can be suitably selected to suit to a particular application, but is preferably from 3 to 10 m, more preferably from 4 to 7 μm. When the volume average particle diameter is less than 3 m, in the case of a two-component developer, the toner fuses to the surface of a carrier during long-term stirring in a developing device, which reduces charging ability of the carrier. When the volume average particle diameter is greater than 10 μm, fluctuation of toner particle diameter increases through consumption and supply of the toner in the developer, which makes it difficult to obtain high-resolution high-quality images.

The ratio of the volume average particle diameter to the number average particle diameter of the toner is preferably from 1.00 to 1.25, more preferably from 1.00 to 1.15.

The volume average particle diameter and the ratio of the volume average particle diameter to the number average particle diameter can be measured by a particle size analyzer (MULTISIZER III available from Beckman Coulter, Inc.) with setting the aperture diameter to 100 μm and analyzed with an analysis software program (Beckman Colter Multisizer 3 Version 3.51).

Specifically, 0.5 mL of a 10% by mass aqueous solution of a surfactant (an alkylbenzene sulfonate, NEOGEN SC-A available from DKS Co., Ltd.) is put in a 100-mL glass beaker, then 0.5 g of each toner is added thereto and mixed with a micro spatula, and 80 mL of ion-exchange water is further added thereto. The resulting dispersion liquid is subjected to a dispersion treatment with an ultrasonic disperser (W-113MK-II available from HONDA ELECTRONICS CO., LTD.) for 10 minutes. The dispersion liquid is measured with the MULTISIZER III and ISOTON III (available from Beckman Coulter, Inc.) as a solution for measurement.

In the measurement, the toner sample dispersion liquid is dropped so that the concentration indicated by the apparatus becomes 8±2%.

In this measurement, the concentration is adjusted to 8:2% for the measurement reproducibility of particle diameter. Within this concentration range, no error occurs in the measurement of the particle diameter.

Raw Materials of Toner

The toner according to an embodiment of the present invention comprises mother toner particles. The mother toner particles each contain at least a binder resin and optionally other components, such as a release agent, as necessary. The toner may be further added with an external additive, as necessary.

Binder Resin

The binder resin is not particularly limited and can be suitably selected to suit to a particular application. Examples thereof include, but are not limited to, polyester resin, silicone resin, styrene-acrylic resin, styrene resin, acrylic resin, epoxy resin, diene resin, phenol resin, terpene resin, coumarin resin, amide-imide resin, butyral resin, urethane resin, and ethylene vinyl acetate resin. Each of these can be used alone or in combination with others. Among these, polyester resin and resins obtained by combining polyester resin with the above-described other binder resin are preferred because they have excellent low-temperature fixability and sufficient flexibility even when the molecular weight is reduced.

Polyester Resin

The polyester resin is not particularly limited and can be suitably selected to suit to a particular application. Preferred examples thereof include unmodified polyester resin and modified polyester resin. Each of these can be used alone or in combination with others.

Unmodified Polyester Resin

The unmodified polyester resin is not particularly limited and can be suitably selected to suit to a particular application. Examples thereof include, but are not limited to, a resin obtained by a polyesterification of a polyol represented by the following general formula (1) and a polycarboxylic acid represented by the following general formula (2), and a crystalline polyester resin.

$$A\text{-[OH]}_m \qquad \text{General Formula (1)}$$

$$B\text{-[COOH]}_n \qquad \text{General Formula (2)}$$

In the general formula (1), A represents an alkyl group having 1 to 20 carbon atoms, an alkylene group, or an aromatic group or a heterocyclic aromatic group that may have a substituent; and m represents an integer of from 2 to 4.

In the general formula (2), B represents an alkyl group having 1 to 20 carbon atoms, an alkylene group, an aromatic group or a heterocyclic aromatic group that may have a substituent; and n represents an integer of from 2 to 4.

The polyol represented by the general formula (1) is not particularly limited and can be suitably selected to suit to a particular application. Examples thereof include, but are not limited to, ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Each of these can be used alone or in combination with others.

The polycarboxylic acid represented by the general formula (2) is not particularly limited and can be suitably selected to suit to a particular application. Examples thereof include, but are not limited to, maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isooctyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, empol trimer acid, cyclohexanedicarboxylic acid, cyclohexenedicarboxylic acid, butanetetracarboxylic acid, diphenylsulfonetetracarboxylic acid, and ethylene glycol bis(trimellitic acid). Each of these can be used alone or in combination with others.

Modified Polyester Resin

The modified polyester resin is not particularly limited and can be suitably selected to suit to a particular application. Examples thereof include, but are not limited to, a resin obtained by an elongation reaction and/or cross-linking reaction of an active-hydrogen-group-containing compound with a polyester reactive with the active-hydrogen-group-containing compound (hereinafter "polyester prepolymer"). The elongation reaction and/or cross-linking reaction may be terminated by a reaction terminator (e.g., blocked products of monoamines such as diethylamine, dibutylamine, butylamine, laurylamine, and ketimine compounds), as necessary.

Active-Hydrogen-Group-Containing Compound

The active-hydrogen-group-containing compound acts as an elongation agent or cross-linking agent when the polyester prepolymer undergoes an elongation reaction or cross-linking reaction in an aqueous phase.

The active-hydrogen-group-containing compound is not particularly limited and can be suitably selected to suit to a particular application as long as it has an active hydrogen group. In particular, when the polyester prepolymer is an isocyanate-group-containing polyester prepolymer to be described later, an amine is preferred which can make the molecular weight high.

The active hydrogen group is not particularly limited and can be suitably selected to suit to a particular application. Examples thereof include, but are not limited to, hydroxyl groups (e.g., alcoholic hydroxyl group, phenolic hydroxyl group), amino group, carboxyl group, and mercapto group. Each of these groups may be included alone or in combinations with others.

The amine as the active-hydrogen-group-containing compound is not particularly limited and can be suitably selected to suit to a particular application. Examples thereof include, but are not limited to, diamines, trivalent or higher polyamines, amino alcohols, amino mercaptans, amino acids, and those obtained by blocking the amino groups of these amines.

Specific examples of the diamines include, but are not limited to, aromatic diamines (e.g., phenylenediamine, diethyltoluenediamine, 4,4'-diaminodiphenylmethane), alicyclic diamines (e.g., 4,4'-diamino-3,3'-dimethyldicyclohexylmethane, diaminocyclohexane, isophoronediamine), and aliphatic diamines (e.g., ethylenediamine, tetramethylenediamine, hexamethylenediamine).

Specific examples of the trivalent or higher polyamines include, but are not limited to, diethylenetriamine and triethylenetetramine.

Specific examples of the amino alcohols include, but are not limited to, ethanolamine and hydroxyethylaniline.

Specific examples of the amino mercaptans include, but are not limited to, aminoethyl mercaptan and aminopropyl mercaptan.

Specific examples of the amino acids include, but are not limited to, aminopropionic acid and aminocaproic acid.

Specific examples of amines obtained by blocking the amino group of these amines include, but are not limited to, ketimine compounds obtained from any of these amines (e.g., diamines, trivalent or higher polyamines, amino alcohols, amino mercaptans, amino acids) and ketones (e.g., acetone, methyl ethyl ketone, methyl isobutyl ketone) and oxazoline compounds.

Each of these can be used alone or in combination with others. Among these, diamines and a mixture of a diamine and a small amount of a trivalent or higher polyamine are preferred as the amine.

Polymer reactive with Active-hydrogen-group-containing Compound

The polymer reactive with the active-hydrogen-group-containing compound is not particularly limited and can be suitably selected to suit to a particular application as long as it is a polymer having at least a group reactive with the active-hydrogen-group-containing compound. In particular, urea-bond-forming-group-containing polyester resins (RMPE) are preferred for their high fluidity and excellent transparency when melted, easy adjustment of molecular weight of high-molecular-weight components, and excellent oil-less low-temperature fixability and releasability in dry toners; and isocyanate-group-containing polyester prepolymers are more preferred.

The isocyanate-group-containing polyester prepolymer is not particularly limited and can be suitably selected to suit to a particular application. Examples thereof include, but are not limited to, a polycondensation product of a polyol with a polycarboxylic acid, and a reaction product of an active-hydrogen-group-containing polyester resin with a polyisocyanate.

The polyol is not particularly limited and can be suitably selected to suit to a particular application. Examples thereof include, but are not limited to, alkylene glycols (e.g., ethylene glycol, 1,2-propylene glycol, 1,3-propylene glycol, 1,4-butanediol, 1,6-hexanediol), alkylene ether glycols (e.g., diethylene glycol, triethylene glycol, dipropylene glycol, polyethylene glycol, polypropylene glycol, polytetramethylene ether glycol), alicyclic diols (e.g., 1,4-cyclohexanedimethanol, hydrogenated bisphenol A), bisphenols (e.g., bisphenol A, bisphenol F, bisphenol S), polyvalent aliphatic alcohols (e.g., glycerin, trimethylolethane, trimethylolpropane, pentaerythritol, sorbitol), trivalent or higher phenols (e.g., phenol novolac, cresol novolac), trivalent or higher polyols such as alkylene oxide adducts of trivalent or higher polyphenols, and mixtures of diols with trivalent or higher polyols.

Each of these can be used alone or in combination with others. Among these, a diol alone or a mixture of a diol and a small amount of a trivalent or higher polyol are preferred as the polyol.

Preferably, the diol is composed mainly of an alkylene glycol having 2 to 12 carbon atoms and an alkylene oxide adduct of a bisphenol (e.g., ethylene oxide 2-mol adduct of bisphenol A, ethylene oxide 3-mol adduct of bisphenol A). In addition, an alkylene glycol (e.g., ethylene glycol, 1,2-propylene glycol, 1,3-propylene glycol) may be used for the purpose of adjusting molecular weight and molecular mobility.

The proportion of the polyol in the isocyanate-group-containing polyester prepolymer is not particularly limited and can be suitably selected to suit to a particular application. The proportion is preferably from 0.5% to 40% by mass, more preferably from 1% to 30% by mass, and particularly preferably from 2% to 20% by mass. When the proportion is less than 0.5% by mass, hot offset resistance may deteriorate, and it may become difficult to achieve storability and low-temperature fixability of the toner at the same time. When the proportion is more than 40% by mass, low-temperature fixability may deteriorate.

The polycarboxylic acid is not particularly limited and can be suitably selected to suit to a particular application. Examples thereof include, but are not limited to, alkylene dicarboxylic acids (e.g., succinic acid, adipic acid, sebacic acid), alkenylene dicarboxylic acids (e.g., maleic acid, fumaric acid), aromatic dicarboxylic acids (e.g., terephthalic acid, isophthalic acid, naphthalenedicarboxylic acid), and trivalent or higher polycarboxylic acids (e.g., aromatic polycarboxylic acids having 9 to 20 carbon atoms such as trimellitic acid and pyromellitic acid). Each of these can be used alone or in combination with others.

Among these, alkenylene dicarboxylic acids having 4 to 20 carbon atoms and aromatic dicarboxylic acid having 8 to 20 carbon atoms are preferred as the polycarboxylic acid. In addition, an anhydride or lower alkyl ester (e.g., methyl ester, ethyl ester, and isopropyl ester) of the polycarboxylic acid may be used in place of the polycarboxylic acid.

The mixing ratio between the polyol and the polycarboxylic acid is not particularly limited and can be suitably selected to suit to a particular application. The equivalent ratio [OH]/[COOH] of hydroxyl groups [OH] in the polyol to carboxyl groups [COOH] in the polycarboxylic acid is preferably from 2/1 to 1/1, more preferably from 1.5/1 to 1/1, and particularly preferably from 1.3/1 to 1.02/1.

The polyisocyanate is not particularly limited and can be suitably selected to suit to a particular application. Examples of the polyisocyanate include, but are not limited to, aliphatic polyisocyanates (e.g., tetramethylene diisocyanate, hexamethylene diisocyanate, 2,6-diisocyanatomethylcaproate, octamethylene diisocyanate, decamethylene diisocyanate, dodecamethylene diisocyanate, tetradecamethylene diisocyanate, trimethylhexane diisocyanate, tetramethylhexane diisocyanates); alicyclic polyisocyanates (e.g., isophorone diisocyanate, cyclohexylmethane diisocyanate); aromatic diisocyanates (e.g., tolylene diisocyanate, diphenylmethane diisocyanate, 1,5-naphthylene diisocyanate, diphenylene-4,4'-diisocyanate, 4,4'-diisocyanato-3,3'-dimethyldiphenyl, 3-methyldiphenylmethane-4,4'-diisocyanate, diphenyl ether-4,4'-diisocyanate); araliphatic diisocyanate (e.g., α,α,α',α'-tetramethylxylylene diisocyanate); isocyanurates (e.g., tris-isocyanatoalkyl-isocyanurate, triisocyanatocycloalkyl-isocyanurate); phenol derivative of these compounds; and those blocked with oxime, caprolactam, etc. Each of these can be used alone or in combination with others.

The mixing ratio between the polyisocyanate and the active-hydrogen-group-containing polyester resin (e.g., a hydroxyl-group-containing polyester resin) is not particularly limited and can be suitably selected to suit to a particular application. The equivalent ratio [NCO]/[OH] of isocyanate groups [NCO] in the polyisocyanate to hydroxyl groups [OH] in the hydroxyl-group-containing polyester resin is preferably from 5/1 to 1/1, more preferably from 4/1 to 1.2/1, and particularly preferably from 3/1 to 1.5/1. When the equivalent ratio [NCO]/[OH] is less than 1/1, offset resistance may deteriorate. When the equivalent ratio [NCO]/[OH] is more than 5/1, the low-temperature fixability may deteriorate.

The proportion of the polyisocyanate in the isocyanate-group-containing polyester prepolymer is not particularly limited and can be suitably selected to suit to a particular application. The proportion is preferably from 0.5% to 40% by mass, more preferably from 1% to 30% by mass, and particularly preferably from 2% to 20% by mass. When the proportion is less than 0.5% by mass, hot offset resistance may deteriorate, and it may become difficult to achieve storability and low-temperature fixability at the same time. When the proportion is more than 40% by mass, low-temperature fixability may deteriorate.

The average number of isocyanate groups included in one molecule of the isocyanate-group-containing polyester prepolymer is preferably 1 or more, more preferably from 1.2 to 5, and most preferably from 1.5 to 4. When the average number is less than 1, the molecular weight of the polyester resin (RMPE) modified with a urea-bond-forming-group is lowered to degrade hot offset resistance.

The mixing ratio between the isocyanate-group-containing polyester prepolymer and the amine is not particularly limited and can be suitably selected to suit to a particular application. The equivalent ratio [NCO]/[NHx] of isocyanate groups [NCO] in the isocyanate-group-containing polyester prepolymer to amino groups [NHx] in the amine is preferably from 1/3 to 3/1, more preferably from 1/2 to 2/1, and particularly preferably from 1/1.5 to 1.5/1. When the mixing equivalent ratio [NCO]/[NHx] is less than ⅓, low-temperature fixability may deteriorate. When the mixing equivalent ratio [NCO]/[NHx] is more than 3/1, the molecular weight of the urea-modified polyester resin is lowered to degrade hot offset resistance.

Method for Synthesizing Polymer Reactive with Active-Hydrogen-Group-Containing Compound A method for synthesizing the polymer reactive with the active-hydrogen-group-containing compound is not particularly limited and can be suitably selected to suit to a particular application. For example, the isocyanate-group-containing polyester prepolymer can be synthesized by heating the polyol and the polycarboxylic acid to 150 to 280 degrees C. in the presence of a known esterification catalyst (e.g., titanium tetrabutoxide, dibutyltin oxide), while reducing pressure, if necessary; removing water to obtain a hydroxyl-group-containing polyester; and allowing the hydroxyl-group-containing polyester to react with the polyisocyanate at 40 to 140 degrees C.

The weight average molecular weight (Mw) of the polymer reactive with the active-hydrogen-group-containing compound is not particularly limited and can be suitably selected to suit to a particular application. The weight average molecular weight (Mw) is preferably from 3,000 to 40,000, more preferably from 4,000 to 30,000, when determined from a molecular weight distribution of tetrahydrofuran (THTF)-soluble matter obtained by GPC (gel permeation chromatography). When the weight average molecular weight (Mw) is less than 3,000, storability may deteriorate. When the weight average molecular weight (Mw) exceeds 40,000, low-temperature fixability may deteriorate.

The weight average molecular weight (Mw) can be measured as follows. First, columns are stabilized in a heat chamber at 40 degrees C. Tetrahydrofuran (THF) as a solvent is let to flow in the columns at that temperature at a flow rate of 1 mL per minute, and 50 to 200 μL of a THF solution of a resin having a sample concentration of from 0.05% to 0.6% by mass is injected therein. The molecular weight of the sample is determined by comparing the molecular weight distribution of the sample with a calibration curve that had been compiled with several types of monodisperse polystyrene standard samples, showing the relation between the logarithmic values of molecular weights and the number of counts.

The polystyrene standard samples are those having respective molecular weights of $6\times10$, $2.1\times10^2$, $4\times10^2$, $1.75\times10^4$, $1.1\times10^5$, $3.9\times10^5$, $8.6\times10^5$, $2\times10^6$, and $4.48\times10^6$ (manufactured by Pressure Chemical Company or Toyo Soda Manufacturing Co., Ltd.). It is preferable that at least 10 polystyrene standard samples are used. As a detector, a refractive index (RI) detector can be used.

Release Agent

The release agent is not particularly limited and can be suitably selected to suit to a particular application. Specific examples thereof include, but are not limited to, waxes such as plant waxes (e.g., carnauba wax, cotton wax, sumac wax, rice wax), animal waxes (e.g., beeswax, lanolin), mineral waxes (e.g., ozokerite, ceresin), and petroleum waxes (e.g., paraffin, microcrystalline, petrolatum); non-natural waxes such as synthetic hydrocarbon waxes (e.g., Fischer-Tropsch wax, polyethylene wax) and synthetic waxes (e.g., ester, ketone, ether); fatty acid amides such as 1,2-hydroxystearamide, stearamide, phthalic anhydride imide, and chlorinated hydrocarbon; and low-molecular-weight crystalline polymers, such as homopolymers and copolymers of polyacrylates such as n-stearyl polymethacrylate and n-lauryl polymethacrylate (e.g., n-stearyl acrylate-ethyl methacrylate copolymer), which have a long-chain alkyl group on a side chain.

Among these, Fischer-Tropsch wax, paraffin wax, micro-crystalline wax, monoester wax, and rice wax are preferred because they generate less unnecessary volatile organic compounds at the time when the toner gets fixed.

Commercially-available products can also be used for the release agent. Examples of commercially-available products of the micro-crystalline wax include, but are not limited to, HI-MIC-1045, HI-MIC-1070, HI-MIC-1080, and HI-MIC-1090 available from Nippon Seiro Co., Ltd.; BE SQUARE 180 WHITE and BE SQUARE 195 available from TOYO ADL CORPORATION; BARECO C-1035 available from Petrolite (now Baker Hughes Company); and CRAYVALLAC WN-1442 available from Cray Valley.

The melting point of the release agent is not particularly limited and can be suitably selected to suit to a particular application, but is preferably from 60 to 100 degrees C., more preferably from 65 to 90 degrees C. When the melting point is 60 degrees C. or higher, even when the toner is stored at a high temperature of from 30 to 50 degrees C., the release agent is prevented from exuding from mother toner, and heat-resistant storage stability can be well maintained. When the melting point is 100 degrees C. or lower, cold offset hardly occurs even when the toner is fixed at a low temperature.

The melting point is measured by DSC (differential scanning calorimetry). For example, the measurement can be performed under the following measurement conditions using instruments TA-60WS and DSC-60 available from Shimadzu Corporation.

Measurement Conditions

Sample container: Aluminum sample pan (with a lid)

Sample quantity: 5 mg

Reference: Aluminum sample pan (containing 10 mg of alumina)

Atmosphere: Nitrogen (Flow rate: 50 mL/min)

Temperature Conditions

1st Temperature rise→Start temperature: 20 degrees C., Temperature rise rate: 10 degrees C./min, End temperature: 150 degrees C., Holding time: None 1st Temperature fall→Temperature fall rate: 10 degrees C./min, End temperature: 20 degrees C., Holding time: None 2nd Temperature rise→Temperature rise rate: 10 degrees C./min, End temperature: 150 degrees C.

The measurement results are analyzed with a data analysis software program (TA-60 version 1.52) available from Shimadzu Corporation.

The temperature at the endothermic peak top measured in the 2nd temperature rise is taken as the melting point.

Preferably, the release agent is present being dispersed in mother toner particles. Therefore, it is preferable that the release agent and the binder resin are not compatible with each other. A method of finely dispersing the release agent in the mother toner particles is not particularly limited and can be suitably selected to suit to a particular application. For example, the release agent can be dispersed by a shearing force applied in a kneading process in producing the toner.

The dispersion state of the release agent can be confirmed by observing a thin section of toner particles with a transmission electron microscope (TEM). The dispersion diameter of the release agent is preferably smaller. However, if it is too small, there are cases where exuding of the releasing agent is insufficient at the time when the toner gets fixed. When the release agent can be observed at a magnification of 10,000 times, it means that the release agent is present in a dispersed state. When the release agent cannot be observed at a magnification of 10,000 times, the release agent insufficiently exudes at the time when the toner gets fixed even when the release agent is finely dispersed.

The proportion of the release agent in the toner is not particularly limited and can be suitably selected to suit to a particular application, but is preferably from 3% to 15% by mass, and more preferably from 5% to 10% by mass. When the proportion is 3% by mass or more (particularly 5% by mass or more), hot offset resistance does not deteriorate. When the proportion is 15% by mass or less (particularly 10% by mass or less), the amount of the release agent exudes at the time when the toner gets fixed is not excessive, and heat-resistant storage stability does not deteriorate, which is not preferable.

Other Components

Colorant

Colorants used for the toner are not particularly limited and can be suitably selected from known colorants to suit to a particular application.

The color of the toner is magenta and contains at least one magenta colorant appropriately selected.

Specific examples of magenta colorants include, but are not limited to, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:1, 49, 50, 51, 52, 53, 53:1, 54, 55, 57, 57:1, 58, 60, 63, 64, 68, 81, 83, 87, 88, 89, 90, 112, 114, 122, 123, 150, 163, 177, 179, 184, 202, 206, 207, 209, 211, and 269; C.I. Pigment Violet 19; and C.I. Vat Red 1, 2, 10, 13, 15, 23, 29, and 35.

The proportion of the colorant in the toner is preferably from 1% to 15% by mass, more preferably from 3% to 10% by mass. When the proportion is less than 1% by mass, the coloring power of the toner may decrease. When the proportion exceeds 15% by mass, the colorant may be poorly dispersed in the toner, causing deterioration of the coloring power and electric properties of the toner.

The colorant may be combined with a resin to become a master batch. The resin to be combined is not particularly limited, but the binder resin or a resin having a similar structure to the binder resin is preferred for the compatibility with the binder resin.

The master batch may be obtained by mixing or kneading the resin and the colorant while applying a high shearing force thereto. To increase the interaction between the colorant and the resin, an organic solvent may be added. Alternatively, the master batch may be obtained by a method called flushing that produces a wet cake of the colorant, which can be used as it is without being dried. In the flushing method, an aqueous paste of the colorant is mixed or kneaded with the resin and the organic solvent so that the colorant is transferred to the resin side, followed by removal of the organic solvent and moisture. The mixing or kneading may be performed by a high shearing dispersing device such as a three roll mill.

Organically-modified Layered Inorganic Mineral

The organically-modified layered inorganic mineral is a layered inorganic mineral in which at least part of ions present between the layers are modified with organic ions. The layered inorganic mineral is an inorganic mineral formed of laminated layers each having a thickness of several nanometers. The term modification is synonymous with introduction of organic ions into ions present between the layers of the layered inorganic mineral, and in a broad sense, intercalation.

It has been found that the layered inorganic mineral exhibits the greatest effect when located in the vicinity of the surface of the toner and is easily located in the vicinity of the surface. Preferably, the organically-modified layered inorganic mineral is uniformly distributed among toner particles regardless of their particle size, so that the organically-modified layered inorganic mineral is uniformly located in the vicinity of the surface of each toner particle. As a result, the content of the organically-modified layered inorganic mineral and the proportion of the organically-modified layered inorganic mineral disposed at the surface are not small even in toner particles having a small particle size. Since the surfaces of such toner particles do not become relatively soft and the external additive is not easily embedded in the mother toner particles, an undesirable phenomenon is avoided in which detachment of the external additive, which is advantageous for imparting toner fluidity, is inhibited.

The presence state of the organically-modified layered inorganic mineral in the toner can be confirmed by cutting a specimen, in which the toner is embedded in an epoxy resin, with a micro-microtome or ultra-microtome and observing the cross-section of the toner with a scanning electron microscope (SEM). In the observation with SEM, it is preferable that a reflected electron image is observed, because the presence of the organically-modified layered inorganic mineral can be observed with a strong contrast. Alternatively, the specimen in which the toner is embedded in an epoxy resin is cut with an ion beam, and the cross-section of the toner is observed with an FIB-STEM (HD-2000 available from Hitachi, Ltd.). In this case also, it is preferable that a reflected electron image is observed for easy visual recognition.

In the present disclosure, the vicinity of the surface of the toner refers to a region extending from the outermost surface of the toner to the inside of the toner for 0 to 300 nm in depth in an observed image of a cross-section of the toner obtained by cutting the specimen in which the toner is embedded in an epoxy resin with a micro-microtome, an ultra-microtome, or an FIB-STEM.

The layered inorganic mineral is not particularly limited and can be suitably selected to suit to a particular application. Examples thereof include, but are not limited to, smectite-group clay minerals (e.g., montmorillonite, saponite, hectorite), kaolin-group clay minerals (e.g., kaolinite), bentonite, attapulgite, magadiite, and kanemite. Each of these can be used alone or in combination with others.

The organically-modified layered inorganic mineral is not particularly limited and can be suitably selected to suit to a particular application. For example, layered inorganic minerals in which at least part of ions present between the layers are modified with organic ions are preferred as the organically-modified layered inorganic mineral. In particular, smectite-group clay minerals having a smectite-type basic crystal structure in which at least part of ions present between the layers of are modified with organic cations are preferred for the dispersion stability in the vicinity of the toner surface, and montmorillonite in which at least part of ions present between the layers of are modified with organic cations and bentonite in which at least part of ions present between the layers of are modified with organic cations are particularly preferred.

Whether or not at least part of ions present between the layers of the layered inorganic mineral are modified with organic ions can be confirmed by gas chromatography mass spectrometry (GCMS). A preferred procedure involves dissolving the binder resin contained in the toner in a solvent, filtering the resulting solution, pyrolyzing the resulting solid with a pyrolyzer, and identifying the structure of organic matter by GCMS. Specifically, the pyrolysis is performed by a pyrolyzer Py-2020D (available from Frontier Laboratories Ltd.) at 550 degrees C., and the identification is thereafter performed by a GCMS equipment QP5000 (available from Shimadzu Corporation).

Examples of the organically-modified layered inorganic mineral further includes a layered inorganic mineral in which part of divalent metals is replaced with trivalent metals to introduce metal anions and at least part of the metal anions is further modified with organic anions.

Commercially-available products can be used for the organically-modified layered inorganic mineral. Specific examples of commercially-available products thereof include, but are not limited to: quaternium-18 bentonite, such as BENTONE® 3, BENTONE® 38, and BENTONE® 38V (available from Elementis Specialties), TIXOGEL VP (available from BYK Additives & Instruments), and CLAYTONE® 34, CLAYTONE® 40, and CLAYTONE® XL (available from BYK Additives & Instruments); stearalkonium bentonite, such as BENTONE® 27 (available from Elementis Specialties), TIXOGEL LG (available from BYK Additives & Instruments), and CLAYTONE® AF and CLAYTONE® APA (available from BYK Additives & Instruments); quaternium-18/benzalkonium bentonite such as CLAYTONE® HT and CLAYTONE® PS (available from BYK Additives & Instruments); organically-modified montmorillonite such as CLAYTONE® HY (available from BYK Additives & Instruments); and organically-modified smectite such as LUCENTITE (available from Co-op Chemical Co., Ltd.). Among these, CLAYTONE® AF and CLAYTONE® APA are particularly preferable.

Particularly preferred examples of the organically-modified layered inorganic mineral include DHT-4A (available from Kyowa Chemical Industry Co., Ltd.) which is modified with a compound having an organic ion and represented by $R_1(OR_2)_nOSO_3M$ (where $R_1$ represents an alkyl group having 13 carbon atoms, $R_2$ represents an alkylene group having 2 to 6 carbon atoms, n represents an integer of from 2 to 10, and M represents a monovalent metal element). Examples of the compound having an organic ion and represented by $R_1(OR_2)_nOSO_3M$, include, but are not limited to, HITENOL 330T (available from DKS Co., Ltd.).

The organically-modified layered inorganic mineral may be combined with a resin to become a master batch. The resin is not particularly limited and can be suitably selected from known ones to suit to a particular application.

The proportion of the organically-modified layered inorganic mineral in the toner is preferably from 0.1% to 3.0% by mass, and particularly preferably from 0.3% to 1.5% by mass. When the proportion is less than 0.1% by mass, the effect of the layered inorganic mineral is hardly exhibited. When the proportion exceeds 3.0% by mass, it is likely that low-temperature fixability is inhibited.

An organic ion modifier, which is a compound having organic ions and capable of modifying at least part of ions present between the layers of the layered inorganic mineral into organic ions, is not particularly limited and can be suitably selected to suit to a particular application. Examples thereof include, but are not limited to, quaternary alkylammonium salts, phosphonium salts, imidazolium salts; sulfates having a backbone such as a branched, unbranched, or cyclic alkyl having 1 to 44 carbon atoms, a branched, unbranched, or cyclic alkenyl having 1 to 22 carbon atoms, a branched, unbranched, or cyclic alkoxy having 8 to 32 carbon atoms, a branched, unbranched, or cyclic hydroxyalkyl having 2 to 22 carbon atoms, ethylene oxide, and propylene oxide; sulfonates having the above backbone; carboxylates having the above backbone; and phosphates having the above backbone. Among these, quaternary alkylammonium salts and carboxylic acids having an ethylene oxide backbone are preferred, and quaternary alkylammonium salts are particularly preferred. Each of these can be used alone or in combination with others.

Specific examples of the quaternary alkylammonium include, but are not limited to, trimethylstearylammonium, dimethylstearylbenzylammonium, dimethyloctadecylammonium, and oleylbis(2-hydroxyethyl)methylammonium.

Charge Controlling Agent

The toner may contain a charge controlling agent for imparting appropriate charging ability to the toner.

Any known charge controlling agent can be used as the charge controlling agent. Since a colored material may change the color tone of the toner, colorless or whitish materials are preferably used for the charge controlling agent. Specific examples of such materials include, but are not limited to, triphenylmethane dyes, chelate pigments of molybdic acid, Rhodamine dyes, alkoxyamines, quaternary ammonium salts (including fluorine-modified quaternary ammonium salts), alkylamides, phosphorus and phosphorus-containing compounds, tungsten and tungsten-containing compounds, fluorine activators, metal salts of salicylic acid, and metal salts of salicylic acid derivatives. Each of these can be used alone or in combination with others.

The proportion of the charge controlling agent is determined based on the type of binder resin used and toner manufacturing method (including dispersing method), and is not limited to any particular value. Preferably, the proportion of the charge controlling agent to the binder resin is from 0.01% to 5% by mass, more preferably from 0.02% to 2% by mass. When the proportion exceeds 5% by mass, the toner charge is so large that the effect of the charge controlling agent is reduced and the electrostatic attracting force to a developing roller is increased. This may result in decline in developer fluidity and image density. When the proportion is less than 0.01% by mass, the initial rising of charge and the charge quantity of the toner are insufficient, thus adversely affecting the image quality.

External Additive

The external additive is not particularly limited and can be suitably selected to suit to a particular application. Specific examples thereof include, but are not limited to, silica particles, hydrophobized silica particles, metal salts of fatty acids (e.g., zinc stearate, aluminum stearate), metal oxides (e.g., titania, alumina, tin oxide, antimony oxide) and hydrophobized products thereof, and fluoropolymers. Among these, hydrophobized silica particles, titania particles, and hydrophobized titania particles are preferred.

Specific examples of commercially-available hydrophobized silica particles include, but are not limited to, HDK H2000T, HDK H2000/4, HDK H2050EP, HVK21, and HDK H1303VP (available from Clariant (Japan) K. K.); and R972, R974, RX200, RY200, R202, R805, R812, and NX90G (available from Nippon Aerosil Co., Ltd.).

Specific examples of commercially-available titania particles include, but are not limited to, P-25 (available from Nippon Aerosil Co., Ltd.); STT-30 and STT-65C-S(available from Titan Kogyo, Ltd.); TAF-140 (available from Fuji Titanium Industry Co., Ltd.); and MT-150W, MT-500B, MT-600B, and MT-150A (available from TAYCA Corporation).

Specific examples of commercially-available hydrophobized titanium oxide particles include, but are not limited to, T-805 (available from Nippon Aerosil Co., Ltd.); STT-30A and STT-65S-S(available from Titan Kogyo, Ltd.); TAF-500T and TAF-1500T (available from Fuji Titanium Industry Co., Ltd.); MT-100S and MT-100T (available from TAYCA Corporation); and IT-S(available from Ishihara Sangyo Kaisha, Ltd.).

The amount of the external additive is not particularly limited and can be suitably selected to suit to a particular application, but is preferably from 0.3 to 3.0 parts by mass, more preferably from 0.5 to 2.0 parts by mass, based on 100 parts by mass of mother toner particles.

The total coverage of the external additive with respect to the mother toner particles is not particularly limited, but is preferably from 50% to 90%, more preferably from 60% to 80%.

Toner Production Method

The toner according to an embodiment of the present invention is not limited in production method and material and all known methods and materials can be used under specific conditions. For example, the toner may be produced by a kneading-pulverization method or a chemical method that granulates toner particles in an aqueous medium.

Specific examples of the chemical method include, but are not limited to: suspension polymerization method, emulsion polymerization method, seed polymerization methods, and dispersion polymerization methods, each of which uses a monomer as a starting material; dissolution suspension methods in which a resin or resin precursor is dissolved in an organic solvent and then dispersed or emulsified in an aqueous medium; ester elongation methods that are dissolution suspension methods in which an oil phase composition, which includes a resin precursor having a functional group reactive with an active hydrogen group ("reactive-group-containing prepolymer"), is emulsified or dispersed in an aqueous medium containing fine resin particles, and the reactive-group-containing prepolymer is allowed to react with an active-hydrogen-group-containing compound in the aqueous medium; phase-inversion emulsification methods in which a solution comprising a resin or resin precursor and an appropriate emulsifier is phase-inverted by addition of water; and aggregation methods in which resin particles obtained by the above methods and remaining dispersed in the aqueous medium are aggregated and granulated into particles having a desired size by heat melting or the like. Among these, toners obtained by dissolution suspension methods, ester elongation methods, and aggregation methods are preferred for granulation properties (e.g., particle size distribution control, particle shape control), and toners obtained by ester elongation methods are more preferred.

Details of these production methods are described below.

The kneading-pulverization method is a method for producing mother toner particles through the processes of melt-kneading toner materials including at least the colorant, the binder resin, and the release agent, pulverizing the kneaded product, and classifying the pulverized product.

In the melt-kneading process, the toner materials are mixed, and the mixture is melt-kneaded by a melt-kneader. Specific examples of the melt-kneader include, but are not limited to, a single-axis or double-axis continuous kneader and a batch kneader using roll mill. Specific examples of commercially-available products of the melt-kneader include, but are not limited to, TWIN SCREW EXTRUDER KTK available from Kobe Steel, Ltd., TWIN SCREW COMPOUNDER TEM available from Toshiba Machine Co., Ltd., MIRACLE K.C.K available from Asada Iron Works Co., Ltd., TWIN SCREW EXTRUDER PCM available from Ikegai Ironworks Corp, and KOKNEADER available from Buss Corporation. Preferably, the melt-kneading process is performed under an appropriate condition such that the molecular chains of the binder resin are not cut. Specifically, the melt-kneading temperature is determined with reference to the softening point of the binder resin. When the melt-kneading temperature is excessively higher than the softening point, molecular chains may be significantly cut. When the melt-kneading temperature is excessively lower than the softening point, toner components may not be well dispersed therein.

In the pulverizing process, the kneaded product is pulverized. Preferably, the kneaded product is first pulverized into coarse particles, and the coarse particles are then pulverized into fine particles. Suitable pulverization methods include a method which collides particles with a collision board in a jet stream; a method which collides particles with each other in a jet stream; and a method which pulverizes particles in a narrow gap formed between a rotor mechanically rotating and a stator.

In the classifying process, the pulverized product is classified to be adjusted to have a predetermined particle diameter. In the classifying process, ultrafine particles are removed by means of cyclone separator, decantation, or centrifugal separator.

After the pulverizing process is completed, the pulverized product may be classified in an airflow by a centrifugal force, thus preparing mother toner particles having a desired particle diameter.

The dissolution suspension method may include the processes of dissolving or dispersing toner components including at least the binder resin or precursor thereof, the colorant, and the release agent in an organic solvent to prepare an oil phase composition, and dispersing or emulsifying the oil phase composition in an aqueous medium, to prepare mother particles of the toner.

Preferably, the organic solvent in which the toner components are dissolved or dispersed is a volatile solvent having a boiling point of less than 100 degrees C. for easy removal of the organic solvent in the succeeding process.

Specific examples of such organic solvents include, but are not limited to, ester-based or ester-ether-based solvents such as ethyl acetate, butyl acetate, methoxybutyl acetate, methyl cellosolve acetate, and ethyl cellosolve acetate; ether-based solvents such as diethyl ether, tetrahydrofuran, dioxane, ethyl cellosolve, butyl cellosolve, and propylene glycol monomethyl ether; ketone-based solvents such as acetone, methyl ethyl ketone, methyl isobutyl ketone, di-n-butyl ketone, and cyclohexanone; alcohol-based solvents such as methanol, ethanol, n-propanol, isopropanol, n-butanol, isobutanol, t-butanol, 2-ethylhexyl alcohol, and benzyl alcohol; and mixtures of two or more of the above solvents.

In the dissolution suspension method, at the time when the oil phase composition is dispersed or emulsified in the aqueous medium, an emulsifier or dispersant may be used, as necessary.

Examples of the emulsifier or dispersant include, but are not limited to, surfactants and water-soluble polymers. Specific examples of the surfactants include, but are not limited to, anionic surfactants (e.g., alkylbenzene sulfonate, phosphate), cationic surfactants (e.g., quaternary ammonium salt type, amine salt type), ampholytic surfactants (e.g., carboxylate type, sulfate salt type, sulfonate type, phosphate salt type), and nonionic surfactants (e.g., AO-adduct type, polyol type). Each of these surfactants can be used alone or in combination with others.

Specific examples of the water-soluble polymers include, but are not limited to, cellulose compounds (e.g., methyl cellulose, ethyl cellulose, hydroxyethyl cellulose, ethyl hydroxyethyl cellulose, carboxymethyl cellulose, hydroxypropyl cellulose, and saponification products thereof), gelatin, starch, dextrin, gum arabic, chitin, chitosan, polyvinyl alcohol, polyvinylpyrrolidone, polyethylene glycol, polyethyleneimine, polyacrylamide, acrylic-acid-containing or acrylate-containing polymers (e.g., sodium polyacrylate, potassium polyacrylate, ammonium polyacrylate, sodium hydroxide partial neutralization product of polyacrylic acid, sodium acrylate-acrylate copolymer), sodium hydroxide (partial) neutralization product of styrene-maleic anhydride copolymer, and water-soluble polyurethanes (e.g. reaction product of polyethylene glycol or polycaprolactone diol with polyisocyanate).

In addition, the above-described organic solvents and plasticizers may be used in combination as an auxiliary agent for emulsification or dispersion.

Preferably, the toner according to an embodiment of the present invention is produced by granulating mother toner particles by an ester elongation method that is one of dissolution suspension methods in which an oil phase composition, which includes at least the binder resin, a resin precursor having a functional group reactive with an active hydrogen group ("reactive-group-containing prepolymer"), the colorant, and the release agent, is dispersed or emulsified in an aqueous medium containing fine resin particles, and the reactive-group-containing prepolymer is allowed to react with an active-hydrogen-group-containing compound that is contained in the oil phase composition and/or the aqueous medium.

The fine resin particles may be produced by a known polymerization method, and is preferably obtained in the form of an aqueous dispersion liquid thereof. An aqueous dispersion liquid of fine resin particles may be prepared by, for example, one of the following methods (a) to (h).

(a) Subjecting a vinyl monomer as a starting material to one of suspension polymerization, emulsion polymerization, seed polymerization, and dispersion polymerization, thereby directly preparing an aqueous dispersion liquid of fine resin particles.

(b) Dispersing a precursor (e.g., monomer, oligomer) of a polyaddition or polycondensation resin (e.g., polyester resin, polyurethane resin, epoxy resin) or a solvent solution thereof in an aqueous medium in the presence of a dispersant, and allowing the precursor to cure by application of heat or addition of a curing agent, thereby preparing an aqueous dispersion liquid of fine resin particles.

(c) Dissolving an emulsifier in a precursor (e.g., monomer, oligomer) of a polyaddition or polycondensation resin (e.g., polyester resin, polyurethane resin, epoxy resin) or a solvent solution thereof (preferably in a liquid state, may be liquefied by application of heat), and adding water thereto to cause phase-inversion emulsification, thereby preparing an aqueous dispersion liquid of fine resin particles.

(d) Pulverizing a resin produced by a polymerization reaction (e.g., addition polymerization, ring-opening polymerization, polyaddition, addition condensation, condensation polymerization) into particles by a mechanical rotary pulverizer or a jet pulverizer, classifying the particles by size to collect desired-size particles, and dispersing the collected particles in water in the presence of a dispersant, thereby preparing an aqueous dispersion liquid of fine resin particles.

(e) Spraying a solvent solution of a resin produced by a polymerization reaction (e.g., addition polymerization, ring-opening polymerization, polyaddition, addition condensation, condensation polymerization) to form fine resin particles, and dispersing the fine resin particles in water in the presence of a dispersant, thereby preparing an aqueous dispersion liquid of fine resin particles.

(f) Adding a poor solvent to a solvent solution of a resin produced by a polymerization reaction (e.g., addition polymerization, ring-opening polymerization, polyaddition, addition condensation, condensation polymerization), or cooling the solvent solution of the resin in a case in which the resin is dissolved in the solvent by application of heat, to precipitate fine resin particles, removing the solvent to isolate the fine resin particles, and dispersing the fine resin particles in water in the presence of a dispersant, thereby preparing an aqueous dispersion liquid of fine resin particles.

(g) Dispersing a solvent solution of a resin produced by a polymerization reaction (e.g., addition polymerization, ring-opening polymerization, polyaddition, addition condensation, condensation polymerization) in an aqueous medium in the presence of a dispersant, and removing the solvent by application of heat or reduction of pressure, thereby preparing an aqueous dispersion liquid of fine resin particles.

(h) Dissolving an emulsifier in a solvent solution of a resin produced by a polymerization reaction (e.g., addition polymerization, ring-opening polymerization, polyaddition, addition condensation, condensation polymerization), and adding water thereto to cause phase-inversion emulsification, thereby preparing an aqueous dispersion liquid of fine resin particles.

The fine resin particles preferably have a volume average particle diameter of from 10 to 300 nm, more preferably from 30 to 120 nm. When the volume average particle diameter of the fine resin particles is 10 nm or greater (particularly 30 nm or greater) and 300 nm or less (particularly 120 nm or less), the particle size distribution of the toner does not deteriorate, which is preferable.

Preferably, the oil phase has a solid content concentration of about 40% to 80%. When the concentration is too high, the oil phase becomes more difficult to emulsify or disperse in an aqueous medium, or to handle, due to high viscosity. When the concentration is too low, toner productivity decreases.

Toner components other than the binder resin, such as the colorant, the release agent, and the organically-modified layered inorganic mineral, or the master batches thereof, may be independently dissolved or dispersed in an organic solvent and thereafter mixed in a solution or dispersion of the binder resin.

The aqueous medium may comprise water alone or a combination of water with a water-miscible solvent. Specific examples of the water-miscible solvent include, but are not limited to, alcohols (e.g., methanol, isopropanol, ethylene glycol), dimethylformamide, tetrahydrofuran, cellosolves (e.g., methyl cellosolve), and lower ketones (e.g., acetone, methyl ethyl ketone).

The method of dispersing or emulsifying the oil phase in the aqueous medium is not particularly limited and known equipment of low-speed shearing type, high-speed shearing type, frictional type, high-pressure jet type, or ultrasonic type may be used. For reducing the particle size of resulting particles, a high-speed shearing type is preferred. When a high-speed shearing disperser is used, the revolution is typically from 1,000 to 30,000 rpm, preferably from 5,000 to 20,000 rpm, but is not limited thereto. The dispersing temperature is typically from 0 to 150 degrees C. (under pressure) and preferably from 20 to 80 degrees C.

The organic solvent may be removed from the resulting emulsion or dispersion by a known method. For example, a method of gradually heating the whole system being stirred under normal or reduced pressure to completely evaporate the organic solvent contained in liquid droplets may be employed.

Mother toner particles dispersed in the aqueous medium are washed and dried by a known method as follows. First, the dispersion is solid-liquid separated by a centrifugal separator or filter press. The resulting toner cake is re-dispersed in ion-exchange water having a temperature ranging from normal temperature to about 40 degrees C. After optionally adjusting pH by acids or bases, the dispersion is subjected to solid-liquid separation again. These processes are repeated several times to remove impurities and surfactants. The resulting toner cake is then dried by an airflow dryer, a circulation dryer, a decompression dryer, or a vibration fluidizing dryer, thus obtaining toner particles. Undesired ultrafine toner particles may be removed by a centrifugal separator during the drying process. Alternatively, the particle size distribution may be adjusted by a classifier after the drying process.

In the aggregation method, a fine resin particle dispersion liquid comprising at least the binder resin is aggregated with a colorant particle dispersion liquid, optionally further with a release agent particle dispersion liquid, to granulate mother toner particles. The fine resin particle dispersion liquid can be obtained by a known method such as emulsion polymerization, seed polymerization, and phase inversion emulsification. The colorant particle dispersion and the release agent particle dispersion can be obtained by dispersing a colorant or a release agent, respectively, in an aqueous medium by a known wet dispersion method.

As means for controlling the aggregation state, application of heat, addition of a metal salt, or adjustment of pH is preferably employed.

Specific examples of the metal in the metal salt include, but are not limited to, monovalent metals such as sodium and potassium, divalent metals such as calcium and magnesium, and trivalent metals such as aluminum.

Specific examples of the anionic ion in the metal salt include, but are not limited to, chloride ion, bromide ion, iodide ion, carbonate ion, and sulfate ion. Specific preferred examples of the metal salt include, but are not limited to, magnesium chloride, aluminum chloride, and composite bodies or multimers thereof.

By being heated during or after completion of the aggregation process, the fine resin particles are fused to each other in an accelerated manner, which is preferable for homogeneity of the toner. The shape of toner can be controlled by application of heat. Generally, the greater the amount of applied heat, the more spherical the shape of toner.

Mother toner particles dispersed in the aqueous medium may be washed and dried by the above-described methods.

The mother toner particles thus prepared may be mixed with inorganic particles, such as hydrophobic silica powder, for improving fluidity, storability, developability, and transferability.

The mixing of such external additive may be performed with a typical powder mixer, preferably equipped with a jacket for inner temperature control. To vary load history given to the external additive, the external additive may be gradually added or added from the middle of the mixing, while optionally varying the rotation number, rolling speed, time, and temperature of the mixer. The load may be initially strong and gradually weaken, or vice versa. Specific examples of usable mixers include, but are not limited to, V-type mixer, ROCKING MIXER, LOEDIGE MIXER, NAUTA MIXER, and HENSCHEL MIXER. The mother toner particles are then allowed to pass a sieve having a mesh size of 250 or more so that coarse particles and aggregated particles are removed, thereby obtaining toner particles.

Developer

A developer according to an embodiment of the present invention comprises at least the above-described toner and optionally other components such as a carrier. The developer may be either a one-component developer or a two-component developer. When the developer is used for a high-speed printer that is compatible with recent improvement in information processing speed, it is preferable that the developer is a two-component developer for extending the lifespan.

In the case of a one-component developer, the toner hardly aggregates over time even under stress in the developing device. Thus, the toner does not cause filming on a developing roller as a developer bearer and does not fuse to a layer thickness regulator such as a toner layer thinning blade, thereby well maintaining image density stability and transferability to reliably provide excellent image quality. In the case of a two-component developer, the toner hardly aggregates over time even under stirring stress in the developing device. Thus, generation of abnormal image is prevented, thereby well maintaining image density stability and transferability to reliably provide excellent image quality.

Carrier

The carrier is not particularly limited and can be suitably selected to suit to a particular application. Preferably, the carrier includes a core particle and a resin layer (coating layer) coating the core particle.

Core Particle

The core particle is not particularly limited and can be suitably selected to suit to a particular application as long as it has magnetism. Examples thereof include, but are not limited to, ferromagnetic metals (e.g., iron, cobalt), iron oxides (e.g., magnetite, hematite, ferrite), and resin particles in which a magnetic material (e.g., alloys, compounds) is dispersed in a resin. Among these, Mn ferrite, Mn—Mg ferrite, and Mn—Mg—Sr ferrite are preferred because they are environmentally-friendly.

Weight Average Particle Diameter Dw of Core Particles

The weight average particle diameter Dw of the core particles refers to a particle diameter at an integrated value of 50% in a particle size distribution of the core particles obtained by a laser diffraction or scattering method. The weight average particle diameter Dw of the core particles is not particularly limited and can be suitably selected to suit to a particular application, but is preferably from 10 to 80 μm, and more preferably from 20 to 65 m.

The weight average particle diameter Dw of the core particles is determined by measuring a number-based particle diameter distribution (relationship between number frequency and particle diameter) by a particle size distribution meter (MICROTRAC HzRA9320-X100 manufactured by Honeywell) under the conditions described below and calculating according to the following formula (I). Each channel represents a length for dividing the particle size range in the particle size distribution chart into measurement width units, and the lower limit value of the particle size stored in each channel is employed as the representative particle size.

$$Dw=\{1/\Sigma(nD3)\}\times\{\Sigma(nD4)\} \quad (I)$$

In the formula (I), D represents a representative particle size (m) of core particles which are present in each channel, and n represents the total number of core particles which are present in each channel.

Measurement Conditions

[1] Particle size range: 100 to 8 μm

[2] Channel length (Channel width): 2 μm

[3] Number of channels: 46

[4] Refractive index: 2.42

Coating Layer

The coating layer contains at least a resin, and may contain other components such as a filler, as necessary.

Resin

The resin for forming the coating layer of the carrier is not particularly limited and can be suitably selected to suit to a particular application. Specific examples thereof include, but are not limited to: cross-linked copolymers including polyolefin (e.g., polyethylene, polypropylene) or a modification product thereof, polystyrene, acrylic resin, acrylonitrile, vinyl acetate, vinyl alcohol, vinyl chloride, vinylcarbazole, and/or vinyl ether; silicone resins comprising organosiloxane bonds and modification products thereof (e.g., modified with alkyd resin, polyester resin, epoxy resin, polyurethane, or polyimide); polyamide; polyester; polyurethane; polycarbonate; urea resins; melamine resins; benzoguanamine resins; epoxy resins; ionomer resins; polyimide resins; and derivatives thereof. Each of these can be used alone or in combination with others. Among these, silicone resins are preferable.

The silicone resins are not particularly limited and can be suitably selected from generally known silicone resins to suit to a particular application. Specific examples thereof include, but are not limited to, straight silicone resins consisting of organosiloxane bonds and modified silicone resins modified with alkyd, polyester, epoxy, acrylic, or urethane.

Specific examples of the straight silicone resins include, but are not limited to: KR271, KR272, KR282, KR252, KR255, and KR152 (available from Shin-Etsu Chemical Co., Ltd.); and SR2400, SR2405, and SR2406 (available from Dow Corning Toray Co., Ltd.).

Specific examples of the modified silicone resins include, but are not limited to: ES-1001N (epoxy-modified), KR-5208 (acrylic-modified), KR-5203 (polyester-modified), KR-206 (alkyd-modified), and KR-305 (urethane-modified), available from Shin-Etsu Chemical Co., Ltd.; and SR2115 (epoxy-modified) and SR2110 (alkyd-modified), available from Dow Corning Toray Co., Ltd.

The silicone resin may be used alone or in combination with a cross-linkable component and/or a charge amount controlling agent. Examples of the cross-linkable component include silane coupling agents. Specific examples of the silane coupling agents include, but are not limited to, methyltrimethoxysilane, methyltriethoxysilane, octyltrimethoxysilane, and aminosilane coupling agents.

Filler

The filler is not particularly limited and can be suitably selected to suit to a particular application. Examples thereof include, but are not limited to, conductive fillers and non-conductive fillers. Each of these can be used alone or in combination with others. Preferably, both a conductive filler and a non-conductive filler are contained in the coating layer.

The conductive filler refers to a filler having a powder resistivity of 100 Ω·cm or less.

The non-conductive filler refers to a filler having a powder resistivity of greater than 100 Ω·cm.

The powder resistivity of the filler can be measured by a powder resistivity measurement system (MCP-PD51 available from Mitsubishi Chemical Analytech Co., Ltd.) and a resistivity meter (4-terminal 4-probe method, LORESTA GP available from Mitsubishi Chemical Analytech Co., Ltd.) under the following conditions: the sample weight is 1.0 g, the electrode interval is 3 mm, the specimen radius is 10.0 mm, and the load is 20 kN.

Conductive Filler

The conductive filler is not particularly limited and can be suitably selected to suit to a particular application. Specific examples thereof include, but are not limited to, conductive fillers formed of a layer of tin dioxide or indium oxide on a substrate made of aluminum oxide, titanium oxide, zinc oxide, barium sulfate, silicon oxide, or zirconium oxide; and conductive fillers formed of carbon black. Among these, conductive fillers containing aluminum oxide, titanium oxide, or barium sulfate are preferred.

Non-Conductive Filler

The non-conductive filler is not particularly limited and can be suitably selected to suit to a particular application. Specific examples thereof include, but are not limited to, non-conductive fillers formed of aluminum oxide, titanium oxide, barium sulfate, zinc oxide, silicon dioxide, or zirconium oxide. Among these, non-conductive fillers containing aluminum oxide, titanium oxide, or barium sulfate are preferred.

Carrier Production Method

The carrier production method is not particularly limited and can be suitably selected to suit to a particular application. Preferably, the carrier is produced by a method in which the surfaces of the core particles are coated with a coating layer forming solution containing the resin and the filler using fluidized bed coating device. At the time of application of the coating layer forming solution, the resin to be contained in the resin layer may be subjected to condensation. Alternatively, after application of the coating layer forming solution, the resin to be contained in the resin layer may be subjected to condensation.

The method for condensation of the resin is not particularly limited and can be suitably selected to suit to a particular application. For example, the coating layer forming solution may be applied with heat or light to condensate the resin.

Weight Average Particle Diameter Dw of Carrier

The weight average particle diameter Dw of the carrier refers to a particle diameter at an integrated value of 50% in a particle size distribution of the carrier obtained by a laser diffraction or scattering method. The weight average particle diameter Dw of the carrier is not particularly limited and can be suitably selected to suit to a particular application, but is preferably from 10 to 80 μm, and more preferably from 20 to 65 μm.

The weight average particle diameter Dw of the carrier is determined by measuring a number-based particle diameter distribution (relationship between number frequency and particle diameter) by a particle size distribution meter (MICROTRAC HRA9320-X100 manufactured by Honeywell) under the conditions described below and calculating according to the following formula (II). Each channel represents a length for dividing the particle size range in the particle size distribution chart into measurement width units, and the lower limit value of the particle size stored in each channel is employed as the representative particle size.

$$Dw=\{1/\Sigma(nD^3)\}\times\{\Sigma(nD^4)\} \quad \text{(II)}$$

In the formula (II), D represents a representative particle size (μm) of carrier particles which are present in each channel, and n represents the total number of carrier particles which are present in each channel.

Measurement Conditions

[1] Particle size range: 100 to 8 μm

[2] Channel length (Channel width): 2 μm

[3] Number of channels: 46

[4] Refractive index: 2.42

In a case in which the developer is a two-component developer, the mixing ratio of the toner to the carrier is preferably from 2.0% to 12.0% by mass, more preferably from 2.5 to 10.0% by mass.

Toner Accommodating Unit

In the present disclosure, a toner accommodating unit refers to a unit having a function of accommodating toner and accommodating the toner. The toner accommodating unit may be in the form of, for example, a toner accommodating container, a developing device, or a process cartridge. The toner accommodating container refers to a container accommodating the toner. The developing device refers to a device that accommodates toner and is configured to develop an electrostatic latent image into a toner image with the toner. The process cartridge refers to a combined body of an electrostatic latent image bearer (also referred to as an image bearer) with a developing unit accommodating the toner that is detachably mountable on an image forming apparatus. The process cartridge may further include at least one of a charger, an irradiator, and a cleaner.

When the toner accommodating unit according to an embodiment of the present invention is mounted on an image forming apparatus, an image is formed with the toner according to an embodiment of the present invention. Therefore, the toner is prevented from scattering and can be fixed at low temperatures.

Image Forming Method and Image Forming Apparatus

An image forming method according to an embodiment of the present invention includes: an electrostatic latent image forming process in which an electrostatic latent image is formed on an electrostatic latent image bearer; a developing process in which the electrostatic latent image is developed with the toner or developer according to some embodiments of the present invention to form a visible image; a transfer process in which the visible image is transferred onto a recording medium; and a fixing process in which the visible image is fixed on the recording medium. The image forming method may further include other processes such as a neutralization process, a cleaning process, a recycle process, and a control process, if needed.

An image forming apparatus according to an embodiment of the present invention includes: an electrostatic latent image bearer; an electrostatic latent image forming device configured to form an electrostatic latent image on an electrostatic latent image bearer; a developing device containing the toner or developer according to some embodiments of the present invention, configured to develop the electrostatic latent image with the toner or developer to form a visible image; a transfer device configured to transfer the visible image onto a recording medium; and a fixing device configured to fix the visible image on the recording medium. The image forming apparatus may further include other devices such as a neutralizer, a cleaner, a recycler, and a controller, if needed. Details are described below.

Electrostatic Latent Image Forming Process and Electrostatic Latent Image Forming Device The electrostatic latent image forming process is a process in which an electrostatic latent image is formed on an electrostatic latent image bearer.

The electrostatic latent image bearer (also referred to as "electrophotographic photoconductor" or "photoconductor") is not limited in material, shape, structure, and size, and can be appropriately selected from known materials. As the shape, drum-like shape is preferred. Specific examples of the materials include, but are not limited to, inorganic photoconductors such as amorphous silicon and selenium, and organic photoconductors (OPC) such as polysilane and phthalopolymethine. Among these, organic photoconductors (OPC) are preferred for producing images with a higher definition.

The formation of the electrostatic latent image can be conducted by, for example, uniformly charging a surface of the electrostatic latent image bearer and irradiating the surface with light containing image information by the electrostatic latent image forming device.

The electrostatic latent image forming device may include at least a charger to uniformly charge a surface of the electrostatic latent image bearer and an irradiator to irradiate the surface of the electrostatic latent image bearer with light containing image information.

The charging can be conducted by, for example, applying a voltage to a surface of the electrostatic latent image bearer by the charger.

The charger is not particularly limited and can be suitably selected to suit to a particular application. Specific examples thereof include, but are not limited to, contact chargers equipped with a conductive or semiconductive roller, brush, film, or rubber blade and non-contact chargers employing corona discharge such as corotron and scorotron.

Preferably, the charger is disposed in or out of contact with the electrostatic latent image bearer and configured to charge the surface of the electrostatic latent image bearer by applying direct-current and alternating-current voltages in superimposition thereto.

Preferably, the charger is a charging roller disposed close to but out of contact with the electrostatic latent image bearer via a gap tape and configured to charge the surface of the electrostatic latent image bearer by applying direct-current and alternating-current voltages in superimposition thereto.

The irradiation can be conducted by, for example, irradiating the surface of the electrostatic latent image bearer with light containing image information by the irradiator.

The irradiator is not particularly limited and can be suitably selected to suit to a particular application as long as it can irradiate the surface of the electrostatic latent image bearer charged by the charger with light containing information of an image to be formed. Specific examples thereof include, but are not limited to, various irradiators of radiation optical system type, rod lens array type, laser optical type, and liquid crystal shutter optical type.

The irradiation can also be conducted by irradiating the back surface of the electrostatic latent image bearer with light containing image information.

Developing Process and Developing Device

The developing process is a process in which the electrostatic latent image is developed with the toner to form a visible image.

The visible image can be formed by developing the electrostatic latent image with the toner by the developing device.

Preferably, the developing device includes a developing unit storing the toner and is configured to apply the toner to the electrostatic latent image by contacting or without contacting the electrostatic latent image. More preferably, the developing unit is equipped with a container containing the toner.

The developing device may be either a monochrome developing device or a multicolor developing device. Preferably, the developing device includes a stirrer that frictionally stirs and charges the toner and a rotatable magnet roller.

In the developing device, toner particles and carrier particles are mixed and stirred. The toner particles are charged by friction and retained on the surface of the rotating magnet roller, thus forming magnetic brush. The magnet roller is disposed proximity to the electrostatic latent image bearer (photoconductor), so that a part of the toner particles composing the magnetic brush formed on the surface of the magnet roller are moved to the surface of the electrostatic latent image bearer (photoconductor) by an electric attractive force. As a result, the electrostatic latent image is developed with the toner particles and a visible image is formed with the toner particles on the surface of the electrostatic latent image bearer (photoconductor).

Transfer Process and Transfer Device

The transfer process is a process in which the visible image is transferred onto a recording medium. It is preferable that the visible image is primarily transferred onto an intermediate transferor and then secondarily transferred onto the recording medium. Specifically, the transfer process includes a primary transfer process in which the visible image formed with two or more toners with different colors, preferably in full colors, is transferred onto the intermediate transferor to form a composite transferred image, and a secondary transfer process in which the composite transferred image is transferred onto the recording medium.

In the transfer process, the visible image may be transferred by charging the electrostatic latent image bearer (photoconductor) by a transfer charger. The transfer process can be performed by the transfer device. Preferably, the transfer device includes a primary transfer device to transfer the visible image onto an intermediate transferor to form a composite transfer image, and a secondary transfer device to transfer the composite transfer image onto a recording medium.

The intermediate transferor is not particularly limited and can be suitably selected from known transferors to suit to a particular application. Preferred examples thereof include, but are not limited to, a transfer belt.

The transfer device (including the primary transfer device and the secondary transfer device) preferably includes a transferrer configured to separate the visible image formed on the electrostatic latent image bearer (photoconductor) to the recording medium side by charging. The number of the transfer devices is at least one, and may be two or more.

Specific examples of the transferrer include, but are not limited to, a corona transferrer utilizing corona discharge, a transfer belt, a transfer roller, a pressure transfer roller, and an adhesive transferrer.

The recording medium is not limited to any particular material and conventional recording media (recording paper) can be used.

Fixing Process and Fixing Device

The fixing process is a process in which a visible image transferred onto the recording medium is fixed thereon by the fixing device. The fixing process may be conducted every time each color developer is transferred onto the recording medium. Alternatively, the fixing process may be conducted at once after all color developers are superimposed on one another on the recording medium.

The fixing device is not particularly limited and can be suitably selected to suit to a particular application, but preferably includes a heat-pressure member. Specific examples of the heat-pressure member include, but are not limited to, a combination of a heat roller and a pressure roller; and a combination of a heat roller, a pressure roller, and an endless belt.

Preferably, the fixing device includes a heater equipped with a heat generator, a film in contact with the heater, and a pressurizer pressed against the heater via the film, and is configured to allow a recording medium having an unfixed image thereon to pass through between the film and the pressurizer so that the unfixed image is fixed on the recoding medium by application of heat. The heating temperature of the heat-pressure member is preferably from 80 to 200 degrees C.

The fixing device may be used together with or replaced with an optical fixer according to the purpose.

The neutralization process is a process in which a neutralization bias is applied to the electrostatic latent image bearer to neutralize the electrostatic latent image bearer, and is preferably conducted by a neutralizer.

The neutralizer is not particularly limited and can be appropriately selected from known neutralizers as long as it is capable of applying a neutralization bias to the electrostatic latent image bearer. Preferred examples thereof include, but are not limited to, a neutralization lamp.

The cleaning process is a process in which residual toner particles remaining on the electrostatic latent image bearer are removed, and is preferably conducted by a cleaner.

The cleaner is not particularly limited and can be appropriately selected from known cleaners as long as it is capable of removing residual toner particles remaining on the electrostatic latent image bearer. Preferred examples thereof include, but are not limited to, magnetic brush cleaner, electrostatic brush cleaner, magnetic roller cleaner, blade cleaner, brush cleaner, and web cleaner.

The recycle process is a process in which the toner particles removed in the cleaning process are recycled for the developing device, and is preferably conducted by a recycler. The recycler is not particularly limited. Specific examples thereof include, but are not limited to, a conveyor.

The control process is a process in which the above-described processes are controlled, and is preferably conducted by a controller.

The controller is not particularly limited and can be suitably selected to suit to a particular application as long as it is capable of controlling the above-described processes. Specific examples of the controller include, but are not limited to, a sequencer and a computer.

Figure 5:
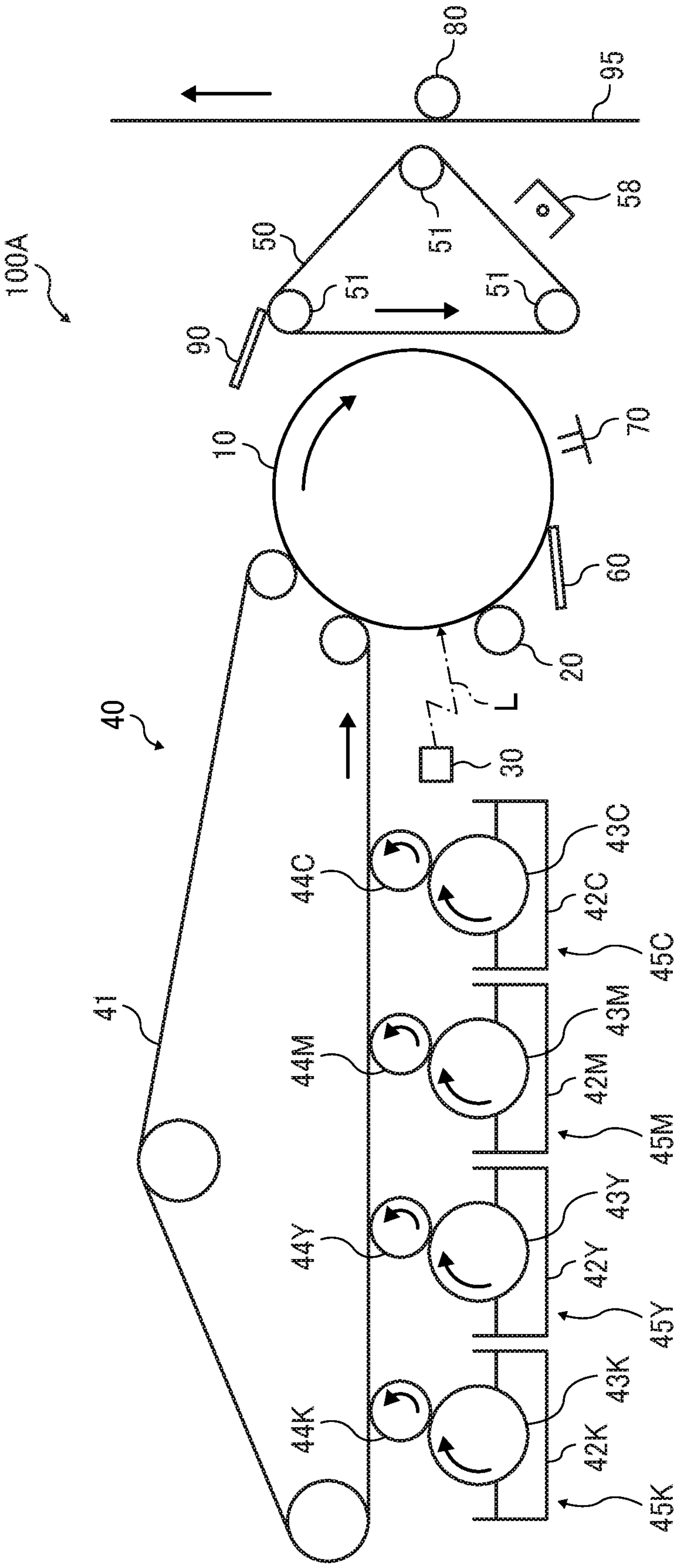
FIG. 5 is a schematic diagram illustrating an image forming apparatus according to an embodiment of the present invention.

FIG. 5 is a schematic view illustrating a first example of the image forming apparatus according to an embodiment of the present invention. An image forming apparatus 100A includes a photoconductor drum 10, a charging roller 20, an irradiator 30, a developing device 40, an intermediate transfer belt 50, a cleaner 60 having a cleaning blade, and a neutralization lamp 70.

The intermediate transfer belt 50 is in the form of an endless belt and is stretched taut by three rollers 51 disposed inside the loop of the endless belt. The intermediate transfer belt 50 is movable in the direction indicated by arrow in FIG. 5. One or two of the three rollers 51 also function(s) as transfer bias roller(s) capable of applying a transfer bias (primary transfer bias) to the intermediate transfer belt 50. A cleaner 90 having a cleaning blade is disposed in the vicinity of the intermediate transfer belt 50. A transfer roller 80 capable of applying a transfer bias (secondary transfer bias) to a transfer sheet 95, for transferring the toner image thereon, is disposed facing the intermediate transfer belt 50.

Around the intermediate transfer belt 50, a corona charger 58 that gives charge to the toner image transferred onto the intermediate transfer belt 50 is disposed between a contact portion of the intermediate transfer belt 50 with the photoconductor drum 10 and another contact portion of the intermediate transfer belt 50 with the transfer sheet 95 in the direction of rotation of the intermediate transfer belt 50.

The developing device 40 includes a developing belt 41, and a black developing unit 45K, a yellow developing unit 45Y, a magenta developing unit 45M, and a cyan developing unit 45C each disposed around the developing belt 41. The black, yellow, magenta, and cyan developing units 45K, 45Y, 45M, and 45C include respective developer containers 42K, 42Y, 42M, and 42C, respective developer supplying rollers 43K, 43Y, 43M, and 43C, and respective developing rollers (developer bearers) 44K, 44Y, 44M, and 44C. The developing belt 41 is in the form of an endless belt and stretched taut by multiple belt rollers. The developing belt 41 is movable in the direction indicated by arrow in FIG. 5. A part of the developing belt 41 is in contact with the photoconductor drum 10.

An image forming operation performed by the image forming apparatus 100A is described below. First, the charging roller 20 uniformly charges a surface of the photoconductor drum 10 and the irradiator 30 irradiates the surface of the photoconductor drum 10 with light L to form an electrostatic latent image. The electrostatic latent image formed on the photoconductor drum 10 is developed with toner supplied from the developing device 40 to form a toner image. The toner image formed on the photoconductor drum 10 is primarily transferred onto the intermediate transfer belt 50 by a transfer bias applied from the roller(s) 51 and then secondarily transferred onto the transfer sheet 95 by a transfer bias applied from the transfer roller 80. After the toner image has been transferred onto the intermediate transfer belt 50, the surface of the photoconductor drum 10 is cleaned by removing residual toner particles by the cleaner 60 and then neutralized by the neutralization lamp 70.

Figure 6:
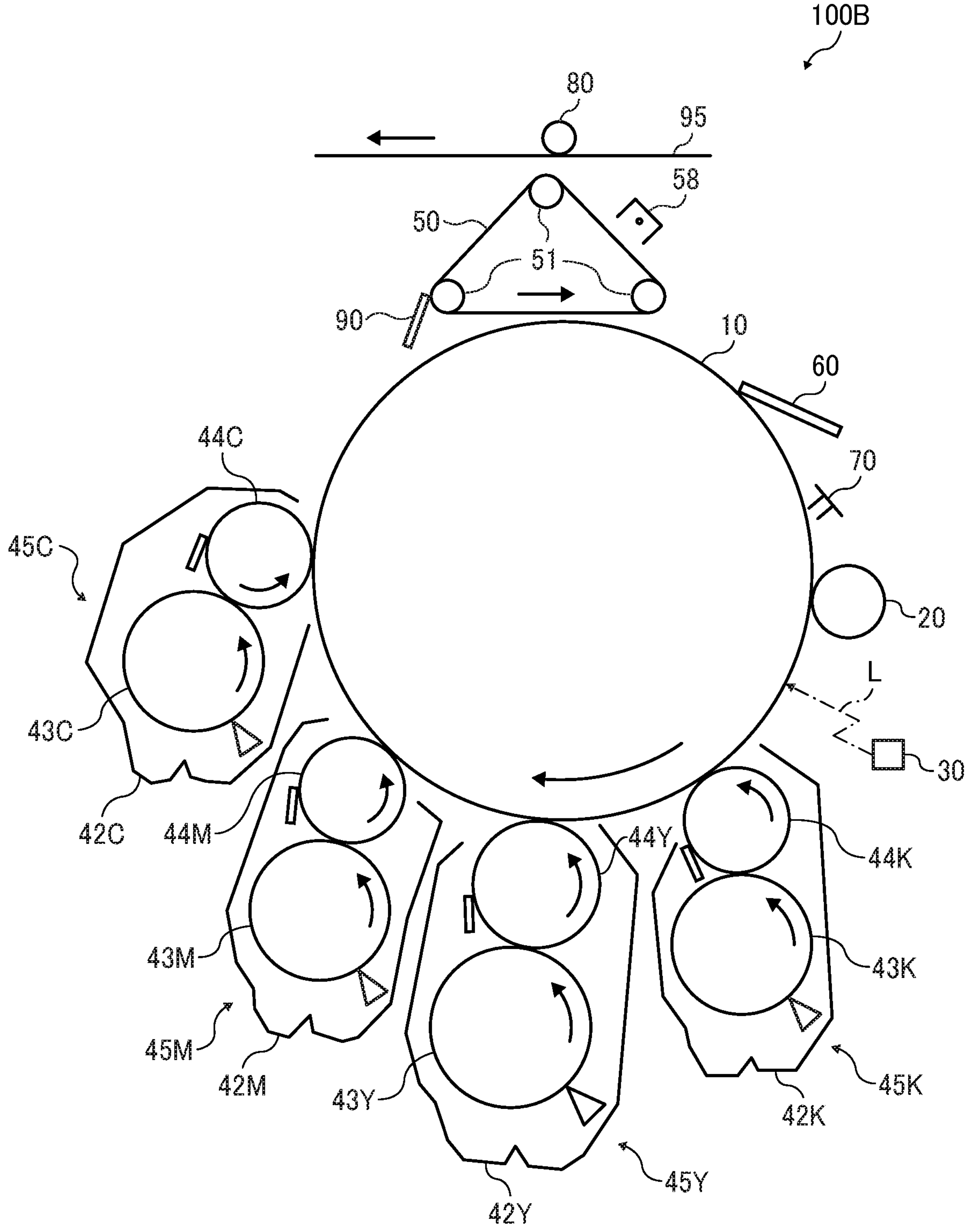
FIG. 6 is a schematic diagram illustrating an image forming apparatus according to an embodiment of the present invention.

FIG. 6 is a schematic view of a second example of the image forming apparatus according to an embodiment of the present invention. An image forming apparatus 100B has a similar configuration to the image forming apparatus 100A except that the developing belt 41 is omitted and the black developing unit 45K, the yellow developing unit 45Y, the magenta developing unit 45M, and the cyan developing unit 45C are disposed facing the circumferential surface of the photoconductor drum 10.

Figure 7:
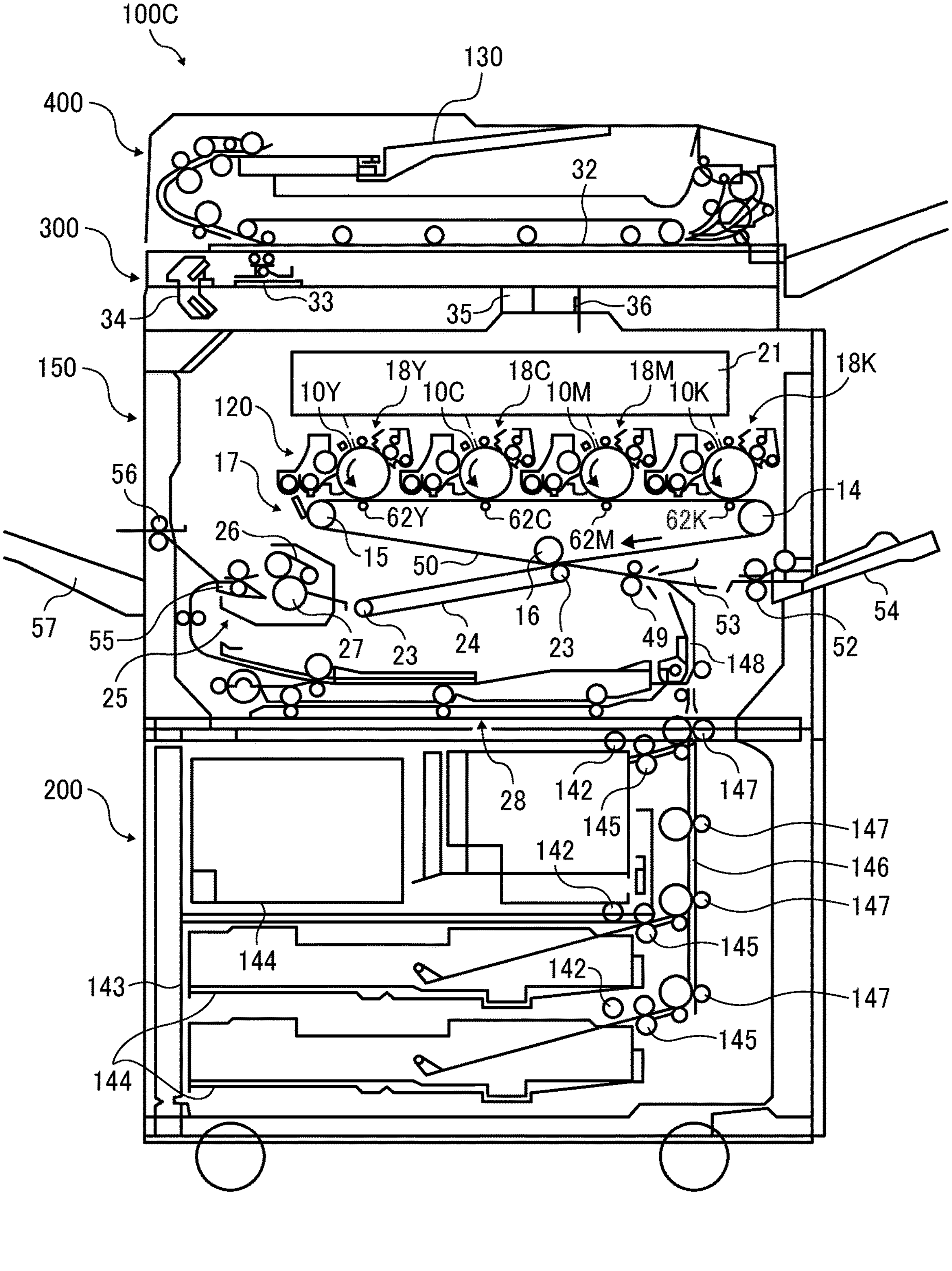
FIG. 7 is a schematic diagram illustrating an image forming apparatus according to an embodiment of the present invention.

FIG. 7 is a schematic view of a third example of the image forming apparatus according to an embodiment of the present invention. An image forming apparatus 100C is a tandem-type full-color image forming apparatus which includes a copier main body 150, a sheet feeding table 200, a scanner 300, and an automatic document feeder (ADF) 400.

An intermediate transfer belt 50, disposed at the center of the copier main body 150, is in the form of an endless belt and stretched taut by three rollers 14, 15, and 16. The intermediate transfer belt 50 is movable in the direction indicated by arrow in FIG. 7. In the vicinity of the roller 15, a cleaner 17 having a cleaning blade is disposed that removes residual toner particles remaining on the intermediate transfer belt 50 from which the toner image has been transferred onto a recording sheet. Four image forming units 18Y, 18C, 18M, and 18K for respectively forming yellow, cyan, magenta, and black images are arranged in tandem along the conveyance direction and facing a part of the intermediate transfer belt 50 stretched between the support rollers 14 and 15, thus forming a tandem unit 120.

In the vicinity of the tandem unit 120, an irradiator 21 is disposed. On the opposite side of the tandem unit 120 relative to the intermediate transfer belt 50, a secondary transfer belt 24 is disposed. The secondary transfer belt 24 is in the form of an endless belt and stretched taut with a pair of rollers 23. A recording sheet conveyed onto the secondary transfer belt 24 is brought into contact with the intermediate transfer belt 50 at between the rollers 16 and 23.

In the vicinity of the secondary transfer belt 24, a fixing device 25 is disposed. The fixing device 25 includes a fixing belt 26 and a pressing roller 27. The fixing belt 26 is in the form of an endless belt and stretched taut between a pair of rollers. The pressing roller 27 is pressed against the fixing belt 26. In the vicinity of the secondary transfer belt 24 and the fixing device 25, a sheet reversing device 28 is disposed for reversing the recording sheet so that images can be formed on both surfaces of the recording sheet.

A full-color image forming operation performed by the image forming apparatus 100C is described below. First, a document is set on a document table 130 of the automatic document feeder 400. Alternatively, a document is set on a contact glass 32 of the scanner 300 while the automatic document feeder 400 is lifted up, followed by holding down of the automatic document feeder 400. As a start switch is pressed, in a case in which the document is set on the automatic document feeder 400, the scanner 300 starts driving after the document is moved onto the contact glass 32. On the other hand, in a case in which the document is set on the contact glass 32, the scanner 300 immediately starts driving. A first traveling body 33 equipped with a light source and a second traveling body 34 equipped with a mirror then start traveling. The first traveling body 33 directs light to the document and the second traveling body 34 reflects light reflected from the document toward a reading sensor 36 through an imaging lens 35. Thus, the document is read by the reading sensor 36 and converted into image information of yellow, magenta, cyan, and black.

Figure 8:
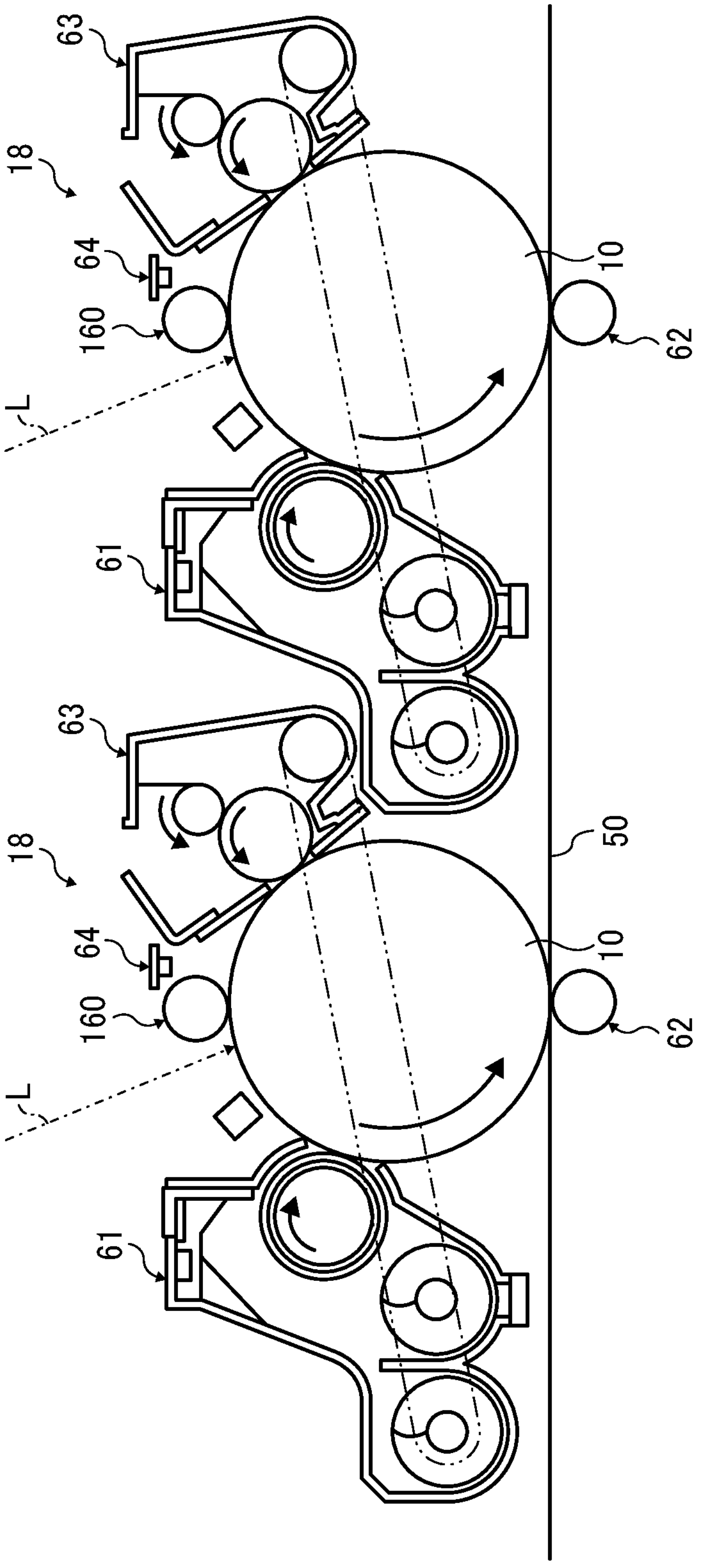
FIG. 8 is a schematic diagram illustrating an image forming apparatus according to an embodiment of the present invention.

The image information of each color is transmitted to the corresponding image forming unit 18Y, 18C, 18M, or 18K to form a toner image of each color. Referring to FIG. 8, each image forming unit 18 includes a photoconductor drum 10, a charging roller 160 to uniformly charge the photoconductor drum 10, a developing device 61 to develop an electrostatic latent image formed on the photoconductor drum 10 into a toner image with a developer of each color, a transfer roller 62 to transfer the toner image onto the intermediate transfer belt 50, a cleaner 63 having a cleaning blade, and a neutralization lamp 64.

The toner images formed in the image forming unit 18Y, 18C, 18M, and 18K are primarily transferred in a successive and overlapping manner onto the intermediate transfer belt 50 stretched and moved by the rollers 14, 15, and 16. Thus, a composite toner image is formed on the intermediate transfer belt 50.

At the same time, in the sheet feeding table 200, one of sheet feed rollers 142 starts rotating to feed recording sheets from one of sheet feed cassettes 144 in a sheet bank 143. One of separation rollers 145 separates the recording sheets one by one and feeds them to a sheet feed path 146. Feed rollers 147 feed each sheet to a sheet feed path 148 in the copier main body 150. The sheet is stopped by striking a registration roller 49. Alternatively, recording sheets may be fed from a manual feed tray 54. In this case, a separation roller 52 separates the sheets one by one and feeds it to a manual sheet feeding path 53. The sheet is stopped upon striking the registration roller 49.

The registration roller 49 is generally grounded. Alternatively, the registration roller 49 may be applied with a bias for the purpose of removing paper powders from the sheet. The registration roller 49 starts rotating in synchronization with an entry of the composite toner image formed on the intermediate transfer belt 50 to between the intermediate transfer belt 50 and the secondary transfer belt 24, so that the recording sheet is fed thereto and the composite toner image can be secondarily transferred onto the recording sheet. Residual toner particles remaining on the intermediate transfer belt 50 after the composite toner image has been transferred are removed by the cleaner 17.

The recording sheet having the composite toner image thereon is fed by the secondary transfer belt 24 to the fixing device 25, and the composite toner image is fixed on the recording sheet. A switch claw 55 switches sheet feed paths so that the recording sheet is ejected by an ejection roller 56 and stacked on a sheet ejection tray 57. Alternatively, the switch claw 55 may switch sheet feed paths so that the recording sheet is introduced into the sheet reversing device 28 and gets reversed. After another image is formed on the back side of the recording sheet, the recording sheet is ejected by the ejection roller 56 on the sheet ejection tray 57.

According to the image forming method and the image forming apparatus according to some embodiments of the present invention, high-quality images can be provided over an extended period of time.

EXAMPLES

The present invention is described in detail with reference to the following Examples but is not limited thereto. In the following descriptions, "%" represents "% by mass" and "parts" represents "parts by mass" unless otherwise specified.

Example 1

Preparation of Toner 1

Synthesis of Polyester Resin

Reaction 1: In a reaction vessel equipped with a nitrogen introducing tube, a dewatering tube, a stirrer, and a thermocouple, ethylene oxide (EO) 3-mol adduct of bisphenol A and 1,2-propylene glycol (PG) in a molar ratio of 90/10 and terephthalic acid (TPA) and adipic acid (APA) in a molar ratio of 70/30, with the ratio OH/COOH being 1.33, were put, then allowed to react in the presence of 500 ppm of titanium tetraisopropoxide at 230 degrees C. under normal pressure for 10 hours.

Reaction 2: Next, the reaction was continued under reduced pressures of from 10 to 15 mmHg for 5 hours.

Reaction 3: Next, 10 parts of trimellitic anhydride (TMA) was put in the reaction vessel and allowed to react at 180 degrees C. under normal pressure for 3 hours. Thus, a polyester resin was prepared.

Synthesis of Prepolymer

In a reaction vessel equipped with a condenser tube, a stirrer, and a nitrogen introducing tube, 682 parts of ethylene oxide 2-mol adduct of bisphenol A, 81 parts of propylene oxide 2-mol adduct of bisphenol A, 283 parts of terephthalic acid, 22 parts of trimellitic anhydride, and 2 parts of dibutyltin oxide were put, then allowed to react at 230 degrees C. under normal pressure for 8 hours and further react under reduced pressures of from 10 to 15 mmHg for 5 hours. Thus, an intermediate polyester resin was prepared.

The intermediate polyester was found to have a number average molecular weight of 2,100, a weight average molecular weight of 9,500, a glass transition temperature (Tg) of 55 degrees C., an acid value of 0.5 mgKOH/g, and a hydroxyl value of 51 mgKOH/g.

In another reaction vessel equipped with a condenser tube, a stirrer, and a nitrogen introducing tube, 410 parts of the intermediate polyester, 89 parts of isophorone diisocyanate, and 500 parts of ethyl acetate were put, then allowed to react at 100 degrees C. for 5 hours. Thus, a prepolymer was prepared. The proportion of free isocyanate in the prepolymer was 1.53%.

Preparation of Release Agent Dispersion Liquid

In a vessel equipped with a stirrer and a thermometer, 70 parts of a carnauba wax (WA-05 available from CERARICA NODA Co., Ltd.), 140 parts of the polyester resin, and 290 parts of ethyl acetate were put and heated to 75 degrees C. while being stirred, maintained at 75 degrees C. for 1.5 hours, and cooled to 30 degrees C. over a period of 1 hour. The resulting liquid was thereafter subjected to a dispersion treatment using a bead mill (ULTRAVISCOMILL available from AIMEX CO., LTD.) filled with 80% by volume of zirconia beads having a diameter of 0.5 mm, at a liquid feeding speed of 5 kg/hour and a disc peripheral speed of 6 m/sec. This dispersing operation was repeated 3 times (3 passes). Thus, a release agent dispersion liquid was prepared.

Preparation of Master Batch

First, 1,000 parts of water, 1,000 parts of C.1. Pigment Red 269, and 1,000 parts of the polyester resin were mixed with a HENSCHEL MIXER (manufactured by Mitsui Mining Co., Ltd.). The mixture was kneaded with a double roll at 150 degrees C. for 30 minutes, then rolled to cool, and pulverized with a pulverizer. Thus, a master batch 1 was prepared.

Preparation of Oil Phase 1

In a vessel equipped with a thermometer and a stirrer, 72 parts of the polyester resin, 113 parts of the release agent dispersion liquid, 68 parts of the master batch 1, and 122 parts of ethyl acetate were put and dispersed by a shearing disperser (TK HOMOMIXER) at a peripheral speed of 12.5 m/sec. The resulting liquid was thereafter subjected to a dispersion treatment using a bead mill (ULTRAVISCOMILL available from AIMEX CO., LTD.) filled with 80% by volume of zirconia beads having a diameter of 0.5 mm, at a liquid feeding speed of 5 kg/hour and a disc peripheral speed of 6 m/sec. This dispersing operation was repeated 3 times (3 passes). Thus, an oil phase 1 was prepared.

Preparation of Fine Resin Particle Aqueous Dispersion

In a reaction vessel equipped with a stirrer and a thermometer, 600 parts of water, 120 parts of styrene, 100 parts of methacrylic acid, 45 parts of butyl acrylate, 10 parts of a sodium alkylallylsulfosuccinate (ELEMINOL JS-2 available from Sanyo Chemical Industries, Ltd.), and 1 part of ammonium persulfate were put and stirred at a revolution of 400 rpm for 20 minutes. Thus, a white emulsion was prepared. The white emulsion was heated to raise the system temperature to 75 degrees C. and allowed to react for 6 hours. Next, 30 parts of a 1% by mass aqueous solution of ammonium persulfate was added to the vessel, and an aging was performed at 75 degrees for 6 hours. Thus, a fine resin particle aqueous dispersion was prepared. The particles contained in this fine resin particle aqueous dispersion were found to have a volume average particle diameter of 60 nm, a weight average molecular weight of 140,000, and a Tg of 73 degrees C.

Preparation of Aqueous Phase

An aqueous phase was prepared by stir-mixing 990 parts of water, 83 parts of the fine resin particle aqueous dispersion, 37 parts of a 48.5% aqueous solution of sodium dodecyl diphenyl ether disulfonate (ELEMINOL MON-7 available from Sanyo Chemical Industries, Ltd.), and 90 parts of ethyl acetate.

Emulsification or Dispersion

To 374 parts of the oil phase 1, 77 parts of an ethyl acetate solution of the prepolymer and 2.5 parts of a 50% ethyl acetate solution of isophoronediamine were added and stirred by a TK HOMOMIXER (available from PRIMIX Corporation) at a revolution of 5,000 rpm to be uniformly dissolved or dispersed therein. Thus, an oil phase 1' was prepared. Next, in another vessel equipped with a stirrer and a thermometer, 550 parts of the aqueous phase were put and stirred by a TK HOMOMIXER (available from PRIMIX Corporation) at a revolution of 11,000 rpm, to which the oil phase 1' was added and emulsified for 1 minute. Thus, an emulsion slurry 1 was prepared.

Solvent Removal, Washing, and Drying

The emulsion slurry 1 was put in a vessel equipped with a stirrer and a thermometer and subjected to solvent removal at 30 degrees C. under reduced pressures for 8 hours. Thus, a slurry 1 was prepared. The slurry 1 was kept at 45 degrees C. for 2 hours, then filtered under reduced pressures, and the following washing operations were carried out.

(1) The filter cake was mixed with 100 parts of ion-exchange water using a TK HOMOMIXER (at a revolution of 6,000 rpm for 5 minutes) and thereafter filtered.

(2) The filter cake of (1) was mixed with 100 parts of ion-exchange water using a TK HOMOMIXER (at a revolution of 6,000 rpm for 5 minutes). A 1% hydrochloric acid solution was then added until the pH became around 3.3 while stirring, and the stirring was continued for 1 hour, followed by filtration.

(3) The filter cake of (2) was mixed with 300 parts of ion-exchange water using a TK HOMOMIXER (at a revolution of 6,000 rpm for 5 minutes) and thereafter filtered. This operation was repeated twice, thus obtaining a filter cake 1.

The resulting filter cake 1 was dried by a circulating air dryer at 40 degrees C. for 48 hours and thereafter sieved with a mesh having an opening of 75 μm. Thus, a mother toner particle 1 was prepared.

Mixing

Next, 100 parts of the mother toner particle 1 and 1.5 parts of a hydrophobic silica HDK-2000 (available from Wacker Chemie AG) were mixed by a 20-L HENSCHEL MIXER (manufactured by Mitsui Mining Co., Ltd.) at a peripheral speed of 33 m/s for 5 minutes. The resulting mixture was sieved with a 500-mesh sieve. Thus, a toner 1 was prepared.

Example 2

The procedure for preparing the oil phase 1 in Example 1 was repeated except for changing the disk peripheral speed of the bead mill (ULTRAVISCOMILL available from AIMEX CO., LTD.) to 8 m/sec. Thus, a toner 2 was prepared.

Example 3

The procedure for preparing the oil phase 1 in Example 1 was repeated except for changing the disk peripheral speed of the bead mill (ULTRAVISCOMILL available from AIMEX CO., LTD.) to 9 m/sec. Thus, a toner 3 was prepared.

Example 4

The procedure for preparing the oil phase 1 in Example 1 was repeated except for changing the disk peripheral speed of the bead mill (ULTRAVISCOMILL available from AIMEX CO., LTD.) to 10 m/sec. Thus, a toner 4 was prepared.

Example 5

The procedure for preparing the oil phase 1 in Example 4 was repeated except for changing the peripheral speed of the shearing disperser to 13.5 m/sec in pre-dispersing. Thus, a toner 5 was prepared.

Example 6

The procedure for preparing the oil phase 1 in Example 5 was repeated except that the bead mill (ULTRAVISCOMILL available from AIMEX CO., LTD.) was filled with 80% by volume of zirconia beads having a diameter of 0.3 mm. Thus, a toner 6 was prepared.

Example 7

Preparation of Layered Inorganic Mineral Master Batch

First, 100 parts of the polyester resin, 100 parts of a montmorillonite compound modified with a quaternary ammonium salt having benzyl group at least partially (CLAYTONE® APA available from BYK Additives & Instruments, having a particle diameter of 500 nm), and 50 parts of ion-exchange water were well mixed and kneaded by an open roll kneader (NEADEX available from NIPPON COKE & ENGINEERING. CO., LTD. (former Mitsui Mining Co., Ltd.)). The kneading was started with a temperature of 90 degrees C., and the temperature was thereafter gradually reduced to 50 degrees C. Thus, a layered inorganic mineral master batch 1 was prepared in which the mass ratio of the resin and the layered inorganic mineral was 1:1.

The procedure for preparing the oil phase 1 in Example 6 was repeated except for replacing 1.6 parts out of 72 parts of the polyester resin with the layered inorganic mineral master batch 1. Thus, a toner 7 was prepared.

Example 8

The procedure for preparing the oil phase 1 in Example 6 was repeated except for replacing 0.8 parts out of 72 parts of the polyester resin with the layered inorganic mineral master batch 1. Thus, a toner 8 was prepared.

Example 9

The procedure for preparing the oil phase 1 in Example 8 was repeated except for changing the disk peripheral speed of the bead mill (ULTRAVISCOMILL available from AIMEX CO., LTD.) to 12 m/sec. Thus, a toner 9 was prepared.

Example 10

The procedure for preparing the oil phase 1 in Example 9 was repeated except that the bead mill (ULTRAVISCOMILL available from AIMEX CO., LTD.) was filled with 80% by volume of zirconia beads having a diameter of 0.2 mm. Thus, a toner 10 was prepared.

Example 11

The procedure for preparing the oil phase 1 in Example 10 was repeated except that the bead mill (ULTRAVISCOMILL available from AIMEX CO., LTD.) was filled with 80% by volume of zirconia beads having a diameter of 0.1 mm. Thus, a toner 11 was prepared.

Comparative Example 1

The procedure for preparing the oil phase 1 in Example 5 was repeated except for omitting the dispersing treatment by the bead mill (ULTRAVISCOMILL available from AIMEX CO., LTD.). Thus, a toner 12 was prepared.

Comparative Example 2

The procedure for preparing the oil phase 1 in Example 8 was repeated except for changing the disk peripheral speed of the bead mill (ULTRAVISCOMILL available from AIMEX CO., LTD.) to 13 m/sec. Thus, a toner 13 was prepared.

Comparative Example 3

The procedure for preparing the oil phase 1 in Example 11 was repeated except for changing the peripheral speed of the shearing disperser to 10.0 m/sec in pre-dispersing. Thus, a toner 14 was prepared.

Comparative Example 4

The procedure in Comparative Example 1 was repeated except that, in addition to the hydrophobic silica, 1.5 parts of a titanium oxide surface-modified with zinc ion were added to the mother toner particle 1 and mixed by a 20-L HENSCHEL MIXER (manufcactured by Mitsui Mining Co., Ltd.) at a peripheral speed of 33 m/s for 5 minutes. Thus, a toner 15 was prepared.

Comparative Example 5

The procedure in Comparative Example 1 was repeated except that a classification was performed by an airflow classifier DS5 (available from Nippon Pneumatic Mfg. Co., Ltd.) after preparation of the mother toner particle 1. Thus, a toner 16 was prepared.

Comparative Example 6

The procedure in Comparative Example 1 was repeated except that the washed filter cake was mixed with 300 parts of ion-exchange water using a TK HOMOMIXER (at a revolution of 6,000 rpm for 5 minutes) and thereafter subjected to a heating treatment for spheroidizing at 55 degrees C. for 1 hour. Thus, a toner 17 was prepared.

The preparation conditions for the above-prepared toners are shown in Table 1.

TABLE 1

| Examples/Comparative examples No. | Toner No. | Shearing Dispersion Peripheral Speed m/s | Media Dispersion Presence of Media Yes/No | Media Dispersion Peripheral Speed m/s | Media Dispersion Media Diameter mm | Inorganic Materials Parts parts | Addition of Surface-modified Titanium Oxide Yes/No | Classification by Airflow Classifier Yes/No | Spheroidizing Heat Treatment Yes/No |
|---|---|---|---|---|---|---|---|---|---|
| Example 1 | Toner 1 | 12.5 | Yes | 6 | 0.5 | 0 | No | No | No |
| Example 2 | Toner 2 | 12.5 | Yes | 8 | 0.5 | 0 | No | No | No |
| Example 3 | Toner 3 | 12.5 | Yes | 9 | 0.5 | 0 | No | No | No |
| Example 4 | Toner 4 | 12.5 | Yes | 10 | 0.5 | 0 | No | No | No |
| Example 5 | Toner 5 | 13.5 | Yes | 10 | 0.5 | 0 | No | No | No |
| Example 6 | Toner 6 | 13.5 | Yes | 10 | 0.3 | 0 | No | No | No |
| Example 7 | Toner 7 | 13.5 | Yes | 10 | 0.3 | 1.6 | No | No | No |
| Example 8 | Toner 8 | 13.5 | Yes | 10 | 0.3 | 0.8 | No | No | No |
| Example 9 | Toner 9 | 13.5 | Yes | 12 | 0.3 | 0.8 | No | No | No |
| Example 10 | Toner 10 | 13.5 | Yes | 12 | 0.2 | 0.8 | No | No | No |
| Example 11 | Toner 11 | 13.5 | Yes | 12 | 0.1 | 0.8 | No | No | No |
| Comparative Example 1 | Toner 12 | 13.5 | No | — | — | 0 | No | No | No |
| Comparative Example 2 | Toner 13 | 13.5 | Yes | 13 | 0.3 | 0.8 | No | No | No |
| Comparative Example 3 | Toner 14 | 10.0 | Yes | 12 | 0.1 | 0.8 | No | No | No |
| Comparative Example 4 | Toner 15 | 13.5 | No | — | — | 0 | Yes | No | No |
| Comparative Example 5 | Toner 16 | 13.5 | No | — | — | 0 | No | Yes | No |
| Comparative Example 6 | Toner 17 | 13.5 | No | — | — | 0 | No | No | Yes |

Measurements

The toners prepared in Examples and Comparative Examples were subjected to the following evaluations.

Measurement of CH Rate

A Raman spectrum was measured for each of 500 to 600 or more toner particles with a laser having a pump wavelength of 785 nm using a Raman microscope XploRA PLUS (available from HORIBA, Ltd.). The CH rate was calculated from the Raman spectrum, and the proportion of particles having a CH rate of 25.0% or more, the proportion of particles having a CH rate of 50.0% or more, and the median of the CH rate were determined. The results are shown in Table 2.

X-ray Fluorescence Analysis (XRF)

Quantification of Layered Inorganic Mineral in Toner

The addition amount of the layered inorganic mineral was determined by X-ray fluorescence.

To create a calibration curve, toners each containing a predetermined amount of a layered inorganic mineral were prepared and the amount of Al contained in the layered inorganic mineral was measured for each toner.

A specimen was prepared by pelletizing 3 g of toner, obtained after drying, by an automatic pressure molding machine (T-BRB-32 manufactured by MAEKAWA TESTING MACHINE MFG. Co., Ltd.) with a load of 6.0 t and a pressurization time of 60 sec (manufacturer conditions) into a pellet having a diameter of 3 mm and a thickness of 2 mm. The amount of Al in the toner was measured by quantitative analysis by a X-ray fluorescence apparatus (ZSX—100e manufactured by Rigaku Corporation), and the proportion (% by mass) of the layered inorganic mineral in the toner was calculated from the above-prepared calibration curve. The measurement results are shown in Table 2.

Measurement of Charge Distribution

The amount of charge (μC/g) of toner was measured by a blow-off powder charge measuring device TB-200 (manufactured by Toshiba Chemical (now KYOCERA Corporation)). The charge distribution was measured by a charge distribution measuring device E-SPART ANALYZER (manufactured by Hosokawa Micron Corporation) as a Q/d distribution (fC/μm), and the proportion of particles in the positively-charged region was calculated as a WST rate.

The results are shown in Table 2.

Measurement of Particle Size Distribution

The particle size distribution of toner was measured by a COULTER MULTISIZER III (manufactured by Beckman Coulter, Inc.) to which a personal computer (manufactured by IBM) was connected. The weight average particle diameter (Dv) based on volume, the number average particle diameter (Dn) based on number distribution, and the ratio (Dv/Dn) were determined using an analysis software program (manufactured by Beckman Coulter, Inc.).

The results are shown in Table 2.

Measurement of Shape Distribution

The average circularity of 3,000 or more particles was measured using a flow particle image analyzer FPIA-3000 (available from Sysmex Corporation), and the proportion of particles having a circularity of 0.850 or less in the measured particles was determined.

TABLE 2

| Examples/Comparative examples No. | Toner No. | CH Rate 25.0% or more % by number | CH Rate 50.0% or more % by number | CH Rate Median % | Proportion of Inorganic Layered Compound XRF % by mass | Charge Distribution WST Rate % | Particle Size Distribution Dv/Dn — | Shape Distribution Rate of 0.85 or less % by number |
|---|---|---|---|---|---|---|---|---|
| Example 1 | Toner 1 | 25.0 | 4.2 | −5.5 | 0 | 10.1 | 1.17 | 1.1 |
| Example 2 | Toner 2 | 23.2 | 2.9 | −4.5 | 0 | 9.7 | 1.17 | 1.0 |
| Example 3 | Toner 3 | 20.1 | 2.8 | −4.3 | 0 | 9.6 | 1.17 | 1.0 |

TABLE 2-continued

| Examples/Comparative examples No. | Toner No. | CH Rate 25.0% or more % by number | CH Rate 50.0% or more % by number | CH Rate Median % | Proportion of Inorganic Layered Compound XRF % by mass | Charge Distribution WST Rate % | Particle Size Distribution Dv/Dn — | Shape Distribution Rate of 0.85 or less % by number |
|---|---|---|---|---|---|---|---|---|
| Example 4 | Toner 4 | 19.7 | 2.6 | −4.0 | 0 | 9.5 | 1.16 | 1.1 |
| Example 5 | Toner 5 | 16.9 | 2.4 | −3.8 | 0 | 9.2 | 1.17 | 0.9 |
| Example 6 | Toner 6 | 13.5 | 1.8 | −3.7 | 0 | 8.5 | 1.15 | 0.8 |
| Example 7 | Toner 7 | 8.7 | 1.5 | −3.5 | 1.6 | 8.2 | 1.16 | 1.3 |
| Example 8 | Toner 8 | 5.8 | 0.5 | −2.8 | 0.8 | 7.7 | 1.14 | 1.2 |
| Example 9 | Toner 9 | 4.5 | 0.2 | −1.3 | 0.8 | 7.5 | 1.14 | 1.1 |
| Example 10 | Toner 10 | 2.8 | 0.3 | −1.8 | 0.8 | 7.4 | 1.13 | 1.1 |
| Example 11 | Toner 11 | 1.0 | 0.8 | −1.9 | 0.8 | 7.3 | 1.13 | 1.0 |
| Comparative Example 1 | Toner 12 | 38.4 | 8.6 | −7.3 | 0 | 11.2 | 1.17 | 1.1 |
| Comparative Example 2 | Toner 13 | 0.5 | 0.0 | −1.9 | 0.8 | 7.7 | 1.14 | 1.0 |
| Comparative Example 3 | Toner 14 | 25.6 | 5.0 | −6.2 | 0.8 | 11.0 | 1.14 | 1.0 |
| Comparative Example 4 | Toner 15 | 38.5 | 10.0 | −7.5 | 0 | 2.0 | 1.17 | 1.2 |
| Comparative Example 5 | Toner 16 | 28.3 | 1.6 | −6.5 | 0 | 11.6 | 1.10 | 0.5 |
| Comparative Example 6 | Toner 17 | 34.4 | 7.9 | −7.1 | 0 | 12.3 | 1.16 | 0.2 |

Preparation of Developer 1

A developer 1 was prepared by mixing 5 parts of the toner 1 and 95 parts of a carrier prepared below with a TURBULA MIXER (available from Shinmaru Enterprises Corporation).

Preparation of Carrier

Silicone resin (Organo straight silicone): 100 parts

Toluene: 100 parts

γ-(2-Aminoethyl) aminopropyl trimethoxysilane: 5 parts

Carbon black: 10 parts

The above materials were dispersed by a homomixer for 20 minutes to prepare a coating layer forming liquid. The coating layer forming liquid was applied to the surfaces of 1,000 parts of spherical magnetite having a particle diameter of 50 m using a fluidized bed coating device. Thus, a magnetic carrier was prepared.

The developer 1 containing the toner 1 was set in an image forming apparatus and subjected to the evaluations of image transferability, in-machine contamination resistance, and cleanability as described below.

Preparation of Developers 2 to 17

Developers 2 to 17 were prepared in the same manner as the developer 1 except for replacing the toner 1 with the toners 2 to 17, respectively.

Evaluation of Transferability

Each of the developers 1 to 17 was set in a copier (IMAGIO MP 7501 manufactured by Ricoh Co., Ltd.) whose linear speed and transfer time had been tuned to 162 mm/sec and 40 msec, respectively, and a running test in which an A4-size solid pattern image having a toner deposition amount of 0.6 mg/cm$^2$ was continuously output as a test image was performed. After the initial test image was output and after the 100,000th test image was output, the primary transfer efficiency and the secondary transfer efficiency were determined from the following formulae (2) and (3), respectively. The evaluation criteria are described below.

Primary Transfer Efficiency (%)=(Amount of Toner Transferred onto Intermediate Transfer Medium)/(Amount of Toner Developed on Electrophotographic Photoconductor)×100   Formula (2)

Secondary Transfer Efficiency (%)=((Amount of Toner Transferred onto Intermediate Transfer Medium)−(Amount of Residual Toner Remaining on Intermediate Transfer Medium))/(Amount of Toner Transferred onto Intermediate Transfer Medium)×100   Formula (3)

Evaluation Criteria

Transferability was evaluated by the product of the primary transfer efficiency and the secondary transfer efficiency based on the following criteria.

Rank: Transfer rate

10: 99.0% or more

9: 98.0% or more and less than 99.0%

8: 96.0% or more and less than 98.0%

7: 94.0% or more and less than 96.0%

6: 92.0% or more and less than 94.0%

5: 90.0% or more and less than 92.0%

4: 88.0% or more and less than 90.0%

3: 86.0% or more and less than 88.0%

2: 84.0% or more and less than 86.0%

1: less than 84.0%

Evaluation of In-machine Contamination Resistance

The developer 1 prepared above was put in a modified digital color copier IMAGIO NEO C600 manufactured by Ricoh Co., Ltd. After completion of a running test in which an image chart having an image area rate of 50% was continuously printed on 100,000 sheets in monochrome mode, the degree of contamination on printed matter and around the image-fixed sheet ejection unit was visually observed and evaluated in comparison with 10 rank samples (R1 to R10).

Here, the higher degree of contamination on printed matter and the image-fixed sheet ejection unit, the lower the rank. The rank $R_1$ means that the degrees of contamination on printed matter and around the fixing unit are both unacceptable, which cannot be put into practical use.

Evaluation of Blade Cleanability

For evaluating blade cleanability, a color copier (IPSIO COLOR 8100 manufactured by Ricoh Co., Ltd.) loaded with the developer and the electrostatic latent image bearer (e.g., electrophotographic photoconductor, photoconductor) was used. After completion of a running test in which an image with an image occupancy rate of 7% was continuously output on 100,000 sheets of TYPE 6000 paper (manufactured by Ricoh Co., Ltd.), an image with an image occupancy rate of 50% was continuously output on 10 sheets at 10 degrees C., 15% RH, and the image forming operation was stopped during the image development on the 10th sheet. At this time, toner particles present on the photoconductor drum upstream and downstream from the cleaning blade were respectively transferred onto a piece of tape. Each piece of tape having the transferred toner particles was attached to a sheet of TYPE 6000 paper and subjected to a measurement of ID (image density) using an instrument X-Rite eXact (available from X-Rite Inc.). The cleaning rate was determined from the measured ID according to the following formula (4).

$$\text{Cleaning Rate (\%)} = \Delta\text{ID}((\text{Transfer Residue ID}) - (\text{Post-cleaning ID}))/(\text{Transfer Residue ID}) \quad \text{Formula (4)}$$

Evaluation Criteria

Rank: Cleaning rate

5: 80% or more

4: 60% or more and less than 80%

3: 40% or more and less than 60%

2: 20% or more and less than 40%

1: less than 20%

Rank 2 is a level equivalent to conventional products, and Rank 1 is a level that cannot be employed as a product.

Comprehensive Judgment

The evaluation criteria for comprehensive judgment are as follows.

All the rank scores were added to obtain a total rank score, and the toners were ranked in five levels based on the total rank score.

"A" is extremely good, "B" is very good, "C" is good, "D" is equivalent to conventional products, and "E" is a level that cannot be put into practical use. "A", "B", and "C" are acceptable, and "D" and "E" are unacceptable.

When the blade cleanability rank was "1", the comprehensive judgment was made "E" regardless of the total rank score.

Comprehensive judgment: Total rank score

AA: 23 or more

A: 18 or more and 22 or less

B: 14 or more and 17 or less

C: 13

D: 12 or less

E: Blade cleanability rank is 1.

The evaluation results are shown in Table 3.

As is clear from the evaluation results in Table 3, in Examples 1 to 11, all of transferability, in-machine contamination resistance, and cleanability are achieved at high levels at the same time. On the other hand, in Comparative Examples 1 to 6, one of transfer rate, in-machine contamination resistance, and cleanability is in low level and has a problem in practical use.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A magenta toner comprising:

toner particles each comprising:

a binder resin that comprises a polestar resin;

a magenta colorant, and a release agent, wherein from 1.0% to 25.0% by number of the toner particles have a CH rate of 25.0% or more in absolute value, wherein the CH rate is calculated from the following formula (1):

$$CH\ \text{rate}(\%) = [(I_n - I_{ave})/I_{ave}] \times 100 \quad \text{Formula (1)}$$

where, in a Raman spectrum of each toner particle, $I_n$ represents an integrated intensity within a wavenumber region of from 2,750 to 3,250 cm when an intensity at a wavenumber λ within a wavenumber region of from 1,200 to 3,250 $cm^{-1}$ is [s] normalized to 1, where a total intensity of all the toner particles is maximum at the wavenumber λ; and $I_{ave}$ represents an average of the $I_n$.

2. The magenta toner of claim 1, wherein 3.0% by number or less of the toner particles have a CH rate of 50.0% or more in absolute value.

TABLE 3

| Examples/Comparative examples No. | Developer No. | Toner No. | Transferability | In-machine Contamination Resistance | Blade Cleanability | Total Rank Score | Comprehensive Judgment |
|---|---|---|---|---|---|---|---|
| Example 1 | Developer 1 | Toner 1 | 4 | 4 | 5 | 13 | C |
| Example 2 | Developer 2 | Toner 2 | 4 | 6 | 5 | 15 | B |
| Example 3 | Developer 3 | Toner 3 | 5 | 6 | 5 | 16 | B |
| Example 4 | Developer 4 | Toner 4 | 7 | 6 | 5 | 18 | A |
| Example 5 | Developer 5 | Toner 5 | 7 | 7 | 5 | 19 | A |
| Example 6 | Developer 6 | Toner 6 | 8 | 9 | 4 | 21 | A |
| Example 7 | Developer 7 | Toner 7 | 9 | 9 | 4 | 22 | A |
| Example 8 | Developer 8 | Toner 8 | 10 | 10 | 4 | 24 | AA |
| Example 9 | Developer 9 | Toner 9 | 10 | 10 | 2 | 22 | A |
| Example 10 | Developer 10 | Toner 10 | 9 | 10 | 2 | 21 | A |
| Example 11 | Developer 11 | Toner 11 | 9 | 10 | 2 | 21 | A |
| Comparative Example 1 | Developer 12 | Toner 12 | 1 | 2 | 5 | 8 | D |
| Comparative Example 2 | Developer 13 | Toner 13 | 10 | 10 | 1 | 21 | E |
| Comparative Example 3 | Developer 14 | Toner 14 | 2 | 3 | 5 | 10 | D |
| Comparative Example 4 | Developer 15 | Toner 15 | 2 | 2 | 5 | 9 | D |
| Comparative Example 5 | Developer 16 | Toner 16 | 2 | 7 | 2 | 11 | D |
| Comparative Example 6 | Developer 17 | Toner 17 | 4 | 2 | 1 | 7 | E |

3. The magenta toner of claim 1, wherein from 5.0% to 20.0% by number of the toner particles have a CH rate of 25.0% or more in absolute value.

4. The magenta toner of claim 1, wherein a median of the CH rate is −3.0% or more.

5. A developer comprising:

the magenta toner of claim 1.

6. A toner accommodating unit comprising:

a container; and the magenta toner of claim 1 accommodated in the container.

7. An image forming apparatus comprising:

an electrostatic image bearer;

an electrostatic latent image forming device configured to form an electrostatic latent image on the electrostatic latent image bearer;

a developing device containing the magenta toner of claim 1, configured to develop the electrostatic latent image with the magenta toner to form a visible image;

a transfer device configured to transfer the visible image onto a recording medium; and a fixing device configured to fix the visible image on the recording medium.

8. An image forming method comprising:

forming an electrostatic latent image on an electrostatic latent image bearer;

developing the electrostatic latent image with the magenta toner of claim 1 to form a visible image;

transferring the visible image onto a recording medium; and fixing the visible image on the recording medium.

9. A method of producing the magenta toner of claim 1, comprising pulverizing a composition comprising the binder resin, the colorant, and the release agent in an organic solvent.

10. The method of claim 9, wherein the pulverizing comprises pulverization by collision and pulverization by shearing.

11. The magenta toner of claim 1, wherein the toner particles comprise 3% to 15% by mass of the release agent.

12. The magenta toner of claim 1, wherein the toner particles comprise 1% to 15% by mass of the colorant.

13. The magenta toner of claim 1, further comprises an organically-modified layered inorganic mineral.

14. The magenta toner of claim 13, wherein the toner comprises 0.1 to 3.0% by mass of the organically-modified layered inorganic mineral.

15. The magenta toner of claim 14, wherein the organically-modified layered inorganic mineral comprises montmorillonite modified with a quaternary ammonium salt.

16. The magenta toner of claim 1, wherein the release agent comprises carnauba wax.

* * * * *